US009323010B2

(12) United States Patent
Kosenko et al.

(10) Patent No.: US 9,323,010 B2
(45) Date of Patent: Apr. 26, 2016

(54) STRUCTURES FORMED USING MONOCRYSTALLINE SILICON AND/OR OTHER MATERIALS FOR OPTICAL AND OTHER APPLICATIONS

(75) Inventors: Valentin Kosenko, Mountain View, CA (US); Edward Lee McBain, Scottsdale, AZ (US); Cyprian Emeka Uzoh, San Jose, CA (US); Pezhman Monadgemi, Fremont, CA (US); Sergey Savastiouk, Saratoga, CA (US)

(73) Assignee: Invensas Corporation, San Jose, CA (US)

( * ) Notice: Subject to any disclaimer, the term of this patent is extended or adjusted under 35 U.S.C. 154(b) by 498 days.

(21) Appl. No.: 13/454,713

(22) Filed: Apr. 24, 2012

(65) Prior Publication Data
US 2013/0177274 A1    Jul. 11, 2013

Related U.S. Application Data

(63) Continuation-in-part of application No. 13/362,898, filed on Jan. 31, 2012, now Pat. No. 8,757,897.

(60) Provisional application No. 61/585,217, filed on Jan. 10, 2012.

(51) Int. Cl.
*G02B 6/00* (2006.01)
*G02B 6/12* (2006.01)
(Continued)

(52) U.S. Cl.
CPC .......... *G02B 6/4214* (2013.01); *G02B 6/3628* (2013.01); *G02B 6/3692* (2013.01);
(Continued)

(58) Field of Classification Search
CPC ............ H01L 21/76898; H01L 29/045; H01L 2224/97; H01L 23/481; G02B 6/4214; G02B 6/3628; G02B 6/3632; G02B 6/3636; G02B 6/364; G02B 6/3644; G02B 6/3648; G02B 6/3652; G02B 6/3692; G02B 6/3696
USPC .......... 385/14, 31, 47–49, 137; 430/321–323; 438/713
See application file for complete search history.

(56) References Cited

U.S. PATENT DOCUMENTS

| 3,761,782 A | 9/1973 | Youmans |
| 4,905,523 A | 3/1990 | Okada |

(Continued)

FOREIGN PATENT DOCUMENTS

| CN | 102169213 B | 2/2015 |
| EP | 0827211 A2 | 3/1998 |

(Continued)

OTHER PUBLICATIONS

Anisotropic etching of surfactant-added TMAH solution by Sekimura, 12th IEEE Conference on Micro Electro Mechanical Systems, p. 650-655, 1999.*

(Continued)

*Primary Examiner* — Robert Tavlykaev
(74) *Attorney, Agent, or Firm* — Haynes and Boone, LLP

(57) ABSTRACT

To fabricate an interposer for interfacing waveguides (e.g. optical fiber cables) to transducers, a cavity (410) is formed in a top surface of a substrate. A first layer (520) is formed over the cavity's bottom surface, with one or more gaps in the first layer's top surface. A second layer (3410) is formed in the one or more gaps. The second layer overlaps the first layer. At least part of the first layer is removed to form channels separated from each other by portions of the second layer that are located in the one or more gaps; at least part of the first layer is removed from under the second layer. The second layer portions in the one or more gaps provide one or more spacers in the cavity; these one or more spacers at least partially cover the channels. Waveguides can be placed into the channels.

13 Claims, 29 Drawing Sheets

(51) Int. Cl.
 G02B 6/30 (2006.01)
 G02B 6/42 (2006.01)
 G02B 6/36 (2006.01)

(52) U.S. Cl.
 CPC ............ *G02B6/3636* (2013.01); *G02B 6/3652* (2013.01); *G02B 6/4249* (2013.01); *Y10T 29/49117* (2015.01)

(56) References Cited

U.S. PATENT DOCUMENTS

| | | | |
|---|---|---|---|
| 5,229,647 A | 7/1993 | Gnadinger | |
| 5,357,103 A | 10/1994 | Sasaki | |
| 5,359,687 A * | 10/1994 | McFarland et al. | 385/49 |
| 5,466,558 A * | 11/1995 | Sasaki | 438/65 |
| 5,502,314 A * | 3/1996 | Hori | 257/10 |
| 5,883,996 A * | 3/1999 | Knapp et al. | 385/88 |
| 5,987,202 A | 11/1999 | Gruenwald et al. | |
| 5,998,234 A | 12/1999 | Murata et al. | |
| 6,115,521 A * | 9/2000 | Tran et al. | 385/52 |
| 6,246,026 B1 | 6/2001 | Vergeest | |
| 6,266,472 B1 * | 7/2001 | Norwood et al. | 385/137 |
| 6,332,719 B1 | 12/2001 | Nishikawa et al. | |
| 6,439,703 B1 | 8/2002 | Anagnostopoulos et al. | |
| 6,603,782 B2 * | 8/2003 | Nakanishi et al. | 372/36 |
| 6,625,357 B2 | 9/2003 | Bowen et al. | |
| 6,787,916 B2 | 9/2004 | Halahan | |
| 6,897,148 B2 | 5/2005 | Halahan et al. | |
| 6,928,226 B2 * | 8/2005 | Caracci et al. | 385/137 |
| 6,933,536 B2 | 8/2005 | Bowen et al. | |
| 6,958,285 B2 | 10/2005 | Siniaguine | |
| 7,001,825 B2 | 2/2006 | Halahan et al. | |
| 7,034,401 B2 | 4/2006 | Savastiouk et al. | |
| 7,060,601 B2 | 6/2006 | Savastiouk et al. | |
| 7,157,016 B2 | 1/2007 | Steinberg | |
| 7,173,327 B2 | 2/2007 | Siniaguine | |
| 7,186,586 B2 | 3/2007 | Savastiouk et al. | |
| 7,241,675 B2 | 7/2007 | Savastiouk et al. | |
| 7,394,963 B2 * | 7/2008 | Hartlef | 385/136 |
| 7,521,360 B2 | 4/2009 | Halahan et al. | |
| 7,547,637 B2 * | 6/2009 | Brask et al. | 438/717 |
| 7,949,211 B1 | 5/2011 | Grzybowski et al. | |
| 7,964,508 B2 | 6/2011 | Savastiouk et al. | |
| 8,031,993 B2 | 10/2011 | Bowen | |
| 2002/0015920 A1 | 2/2002 | Steinberg | |
| 2003/0034438 A1 | 2/2003 | Sherrer | |
| 2003/0108292 A1 * | 6/2003 | Abe | 385/37 |
| 2003/0118288 A1 | 6/2003 | Korenaga et al. | |
| 2003/0123819 A1 | 7/2003 | Nakanish | |
| 2004/0067025 A1 | 4/2004 | Haraguchi et al. | |
| 2004/0169064 A1 * | 9/2004 | Rinne | B23K 1/0004 228/194 |
| 2005/0063634 A1 * | 3/2005 | Cohen | B29D 11/0075 385/14 |
| 2005/0196095 A1 | 9/2005 | Karashima et al. | |
| 2006/0022289 A1 | 2/2006 | Badhei et al. | |
| 2007/0036496 A1 | 2/2007 | Gaebe | |
| 2007/0189659 A1 | 8/2007 | Shau | |
| 2008/0290524 A1 * | 11/2008 | Lanzerotti | H01L 21/76898 257/770 |
| 2009/0214157 A1 | 8/2009 | Okubo et al. | |
| 2010/0221488 A1 | 9/2010 | Mick et al. | |
| 2010/0247042 A1 | 9/2010 | Suzuki et al. | |
| 2011/0075965 A1 | 3/2011 | Demeritt | |
| 2011/0311189 A1 | 12/2011 | Bryon et al. | |
| 2012/0060605 A1 | 3/2012 | Wu et al. | |
| 2012/0146101 A1 * | 6/2012 | Lin | 257/255 |

FOREIGN PATENT DOCUMENTS

| | | |
|---|---|---|
| EP | 0987769 A2 | 3/2000 |
| WO | 2010/105369 A1 | 9/2010 |

OTHER PUBLICATIONS

H. Hsiao et al., "Compact and passive-alignment 4-channel x 2.5-Gbps optical interconnect modules based on silicon optical benches with 45° micro-reflectors", Optics Express, vol. 17, No. 26, Dec. 21, 2009.

T. Bowen et al., "Silicon Interposer for Compact Right Angle Coupling of Flip Chip VCSEL and Detector Arrays to Multi-Facet Endface Optical Fibers", Pan Pacific Symposium Conference Proceedings, Jan. 18, 2011.

J.B. Breedis, "Monte Carlo Tolerance Analysis of a Passively Aligned Silicon Waferboard Package", 2001 Electronic Components and Technology Conference Proceedings, 2001.

Thru-Silicon Vias, Current State of the Technology, Jan. 30, 2011, 4 pages.

Amini, B. Vakili et al. "Sub-Micro-Gravity Capacitive SOI Microaccelerometers," The 13$^{th}$ International Conference on Solid-State Sensors, Actuators and Microsystems, Seoul, Korea, Jun. 5-9, 2005, pp. 515-518.

Bellew, Colby L. et al. "An SOI Process for Fabrication of Solar Cells, Transistors and Electrostatic Actuators," The 12$^{th}$ International Conference on Solid State Sensors, Actuators and Microsystems, Boston, Jun. 8-12, 2003, pp. 1075-1079.

Bauer, Tomas "High Density Through Wafer Via Technology," Silex Microsystems, NSTI-Nanotech 2007, www.nsti.org, ISBN 1420061844 vol. 3, 2007, pp. 116-119.

Thevenoud, J-M. et al, "DRIE Technology: From Micro to Nanoapplications," Alcatel Micro Machining Systems, ESIEE, no later than Jun. 12, 2011, pp. 1-8.

Long-Sun Huang, "Silicon Bulk Micromachining in MEMS Packaging and Optical Applications", Dissertation submitted for the degree Doctor of Philosophy in Mechanical Engineering, University of California, Los Angeles, 1999.

M.J. Madou, "MEMS Fabrication", in *The MEMS handbook*, Chapter 16, edited by Mohamed Gad-el-Hak, CRC Press, 2001.

X. Zheng et al., "Optical proximity communication using reflective mirros", Optics Express, vol. 16, No. 19, Sep. 15, 2008.

I. Zubel et al., "Micromirrors inclined at 45° towards Si substrates fabricated by anisotropic etching", Optica Applicata, vol. XLI, No. 2, 2011.

Wikipedia File: Silicon-unit-cell-3D-balls.png, http://en.wikipedia.org/wiki/File:Silicon-unit-cell-3D-balls.png, no. later than Mar. 14, 2012.

Properties of silicon and silicon 14, 2012. wafers, http://www.el-cat.com/silicon-properties.htm, no. later than Mar. 14, 2012.

D.J. Hayes et al., "Printing System for MEMS Packaging", Proceedings, SPIE Conference on Micromachining and Microfabrication, Oct. 2001.

Kosenko et al., U.S. Appl. No. 13/042,186, filed Mar. 7, 2011, 34 pages.

Kosenko et al., U.S. Appl. No. 13/181,006, filed Jul. 12, 2011, 38 pages.

PCT Notification of Transmittal of the International Search Report and the Written Opinion of the International Searching Authority or the Declaration, International Search Report, and Written Opinion of the International Searching Authority in PCT/US2013/020562, dated Jul. 19, 2013, 17 pages.

Sekimura, M., *Anisotropic Etching of Surfactant-Added TMAH Solution*, Micro Electro Mechanical Systems, 1999, MEMS'99, Twelfth IEEE International Conference in Orlando, FL USA Jan. 17-21, 1999, Piscataway, NJ USA, IEEE, US Jan. 17, 1999, pp. 650-655, XP010321781, ISBN: 978-0-7803-5194-3 p. 655; figure 13.

Invitation to Pay Additional Fees and, Where Applicable, Protest Fee in corresponding International Application No. PCT/US2013/020562 dated Apr. 23, 2013.

International Search Report and Written Opinion in corresponding International Application No. PCT/2013/020578 dated Apr. 24, 2013.

Office Action in related U.S. Appl. No. 13/362,898, mailed Oct. 28, 2013, 12 pages.

* cited by examiner

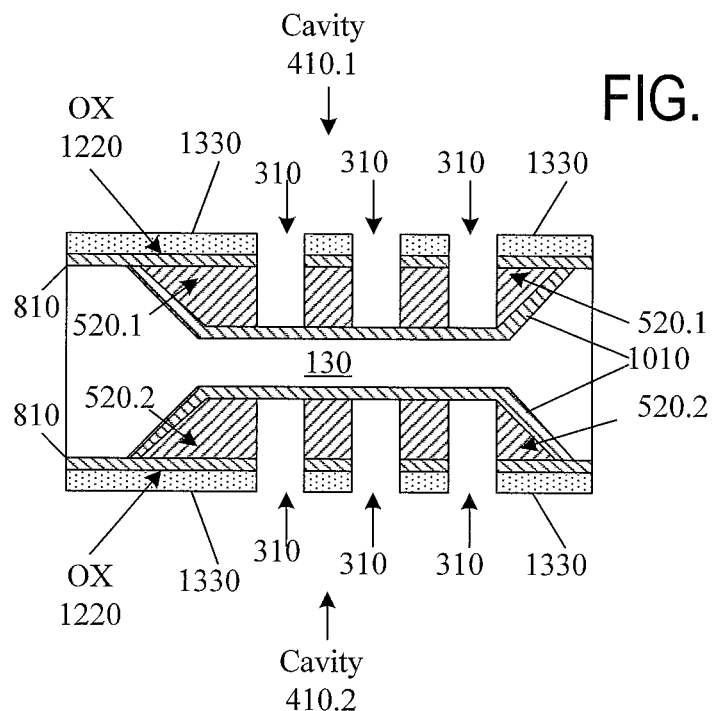
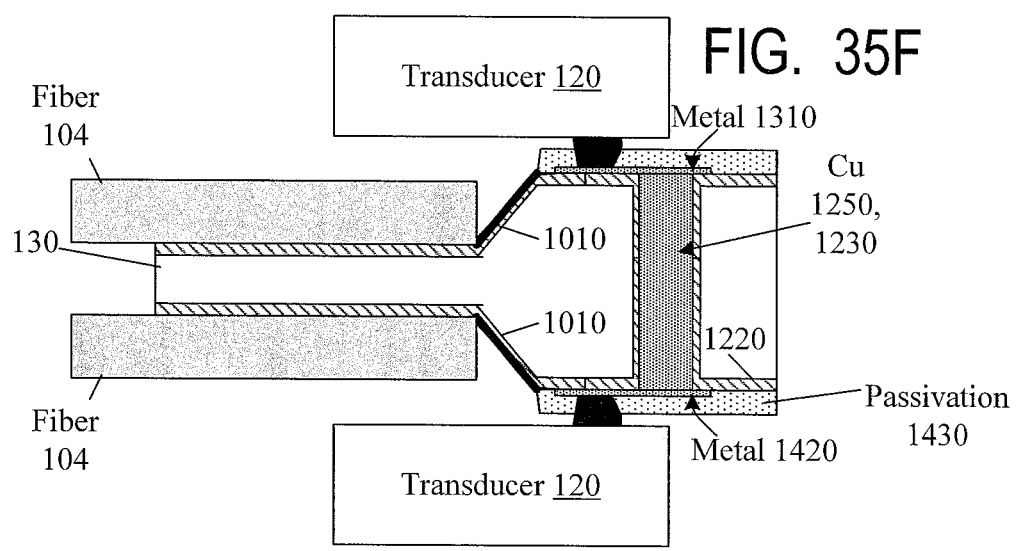

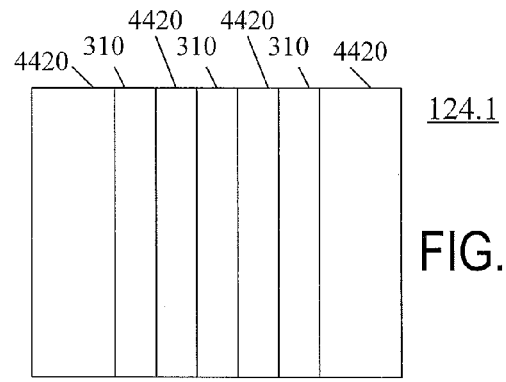
FIG. 44A
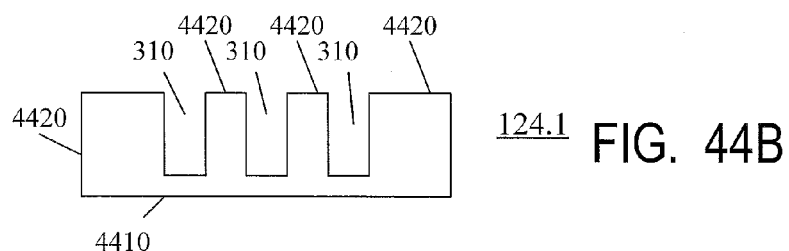
FIG. 44B
FIG. 45
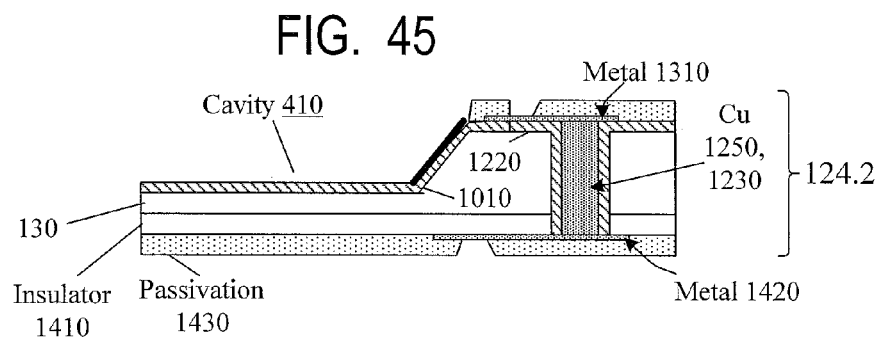
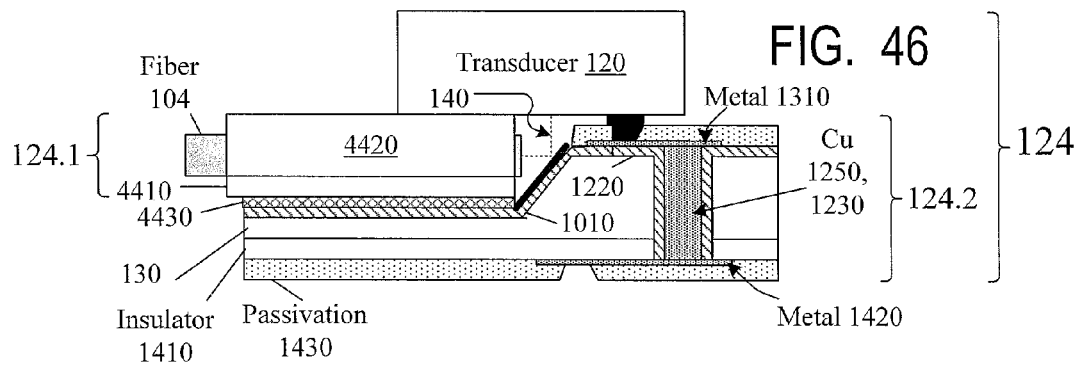
FIG. 46

STRUCTURES FORMED USING MONOCRYSTALLINE SILICON AND/OR OTHER MATERIALS FOR OPTICAL AND OTHER APPLICATIONS

CROSS-REFERENCE TO RELATED APPLICATIONS

The present application is a continuation-in-part of U.S. patent application Ser. No. 13/362,898, filed Jan. 31, 2012 by V. Kosenko et al., incorporated herein by reference, which claims priority of U.S. provisional application No. 61/585,217 filed by V. Kosenko et al. on Jan. 10, 2012, incorporated herein by reference. The present application also claims priority of the aforementioned U.S. provisional application No. 61/585,217 filed by V. Kosenko et al. on Jan. 10, 2012.

BACKGROUND OF THE INVENTION

The present invention relates to structures that can be used for circuits that process optical signals and for other circuits. (The terms "optical" and "light" as used herein denote electromagnetic radiation of any spectrum, not limited to visible light; the terms "optical fiber" or just "fiber" denote an optical fiber cable.) The present invention also relates to etching of monocrystalline silicon substrates to provide suitable angles that can be used for optical and non-optical purposes.

Fiber optics is increasingly used to transmit information to and from electrical circuits. Energy conversion between optical fiber and electrical circuitry is performed by opto-electrical transducers. Miniature packages have been created which combine the transducers, the optical fiber, and electrical circuitry to achieve high speed and low power losses. One example is described in Hsu-Liang Hsiao et al., "Compact and passive-alignment 4-channel x 2.5-Gbps optical interconnect modules based on silicon optical benches with 45° micro-reflectors", OPTICS EXPRESS, 21 Dec. 2009, Vol. 17, No. 26, pages 24250-24260, illustrated in FIGS. 1-3.

FIG. 1 shows optical fibers 104 (104.1 and 104.2) used to interconnect integrated circuits (chips) 110.1, 110.2 mounted on respective printed circuit boards (PCBs) 114.1, 114.2. Chip 110.1, fiber 104.1, and PCB 114.1 are part of a signal transmitting module 116.1. Chip 1101.2, fiber 104.2, and PCB 114.2 are part of a signal receiving module 116.2. Electrical signals from chip 110.1 are provided to an opto-electronic transducer 120.1 for conversion to light. Transducer 120.1 is an integrated circuit (IC or "chip") containing a semiconductor laser (vertical-cavity surface emitting laser, "VCSEL"). Transducer 120.1 is mounted on a silicon interposer (silicon optical bench, or SiOB) 124.1 made using a silicon substrate 130.1. Conductive lines 134.1 transmit electrical signals from chip 110.1 to transducer 120.1. In response, the transducer produces optical signals in a vertical light beam 140.1. Light beam 140.1 is reflected by a mirror 144.1 formed of a gold layer deposited on the silicon interposer's surface inclined at 45° to the horizontal. The reflected beam from mirror 144.1 enters the optical fiber 104.1.

Fiber 104.1 is connected to a fiber 104.2 of module 116.2 by a connector 150. Module 116.2 is similar to module 116.1. The optical signals are emitted from fiber 104.2 in a horizontal beam 140.2, which is reflected by a 45° mirror 144.2 to travel vertically to a transducer 120.2. The mirror is part of a silicon interposer 124.2 made using silicon substrate 130.2. Transducer 120.2 is mounted on interposer 124.2. Transducer 120.2 is a photodetector integrated circuit which converts the optical signals into electric signals provided, via conductive lines 134.2, to chip 110.2. Interposer 124.2 and chip 110.2 are mounted on PCB 114.2.

FIGS. 2 and 3 illustrate a module 116 which can be 116.1 or 116.2. FIG. 2 is a top view, and FIG. 3 shows a cross section by a plane transversal to fibers 104. Each module 116.1, 116.2 has four fibers 104 (i.e. 104.1 or 104.2); transducer 120.1 has four lasers emitting four respective beams 140.1 entering four respective fibers 104.1; transducer 120.2 has four photodetectors which receive four respective beams 140.2 passing through four respective fibers 104.2. As shown in FIG. 2, in each module, monocrystalline silicon substrate 130 having (100)-orientation supports all the four fibers 104. The fibers are mounted in V-grooves 310 formed by a wet etch of substrate 130. The etch also forms the silicon surface underlying the mirror 144. The V-grooves have 45°-sloped sidewalls. The 45° angle is produced by an anisotropic wet etch of silicon substrate 130 which is a monocrystalline silicon wafer of (100)-orientation. The sloped sidewalls are (110) crystal planes. The etchant is a solution of KOH (potassium hydroxide) and isopropyl alcohol (IPA) chosen to suppress the etching rate of {110} planes to a level below the etching rate of {111} planes. The 45° angle so produced is highly precise, which helps in precise positioning of fibers 104 because the fibers do not reach the groove bottom and the fiber position is therefore determined by the angle of the grooves' sidewalls (45°) and the groove's width at the top.

SUMMARY

This section summarizes some features of the invention. Other features may be described in the subsequent sections. The invention is defined by the appended claims, which are incorporated into this section by reference.

Some embodiments of the present invention provide optical interposers and methods of their fabrication that allow precise fiber positioning in grooves of different shapes. For example, rectangular grooves can be used (with vertical sidewalls). Vertical sidewalls may be desirable to reduce the pitch between the adjacent fibers (measured as the distance between the centers of the adjacent fibers or adjacent grooves). For example, in FIG. 3, the width of each groove at the top is greater than each fiber's diameter. If the sidewalls are vertical, then the width of each groove can be equal to the fiber's diameter. A denser, more compact structure can therefore be provided for a given fiber diameter (i.e. the diameter-to-pitch ratio can be increased). Further, if the sidewalls are vertical, then the groove width, and the spacing between the grooves, are independent of the grooves' depth (with V-grooves, the grooves' width at the top increases with depth, and the spacing between the grooves correspondingly decreases). If the groove width and the spacing between the grooves are independent of the grooves' depth, then the fibers' vertical position (defined by the depth) is independent of the spacing between the grooves. This is advantageous because the areas between the grooves can be used for various purposes (e.g. for circuitry or for mechanical support of cantilevered transducers), and the spacing between the grooves can be optimized independently from the fibers' vertical positions.

However, the invention includes V-groove embodiments, and is not limited to vertical sidewalls or other features described herein except as defined by the claims. Also, in the V-groove embodiments, the sidewall angle may be different than 45°. The angle may be any value. In some embodiments, the angle is above 85° (measured from the horizontal) but not greater than 90°. In other embodiment, the angle is above 90°, i.e. the grooves' sidewalls overhang the grooves. Rounded sidewalls and other groove shapes are also possible. See e.g. U.S. Pat. No. 6,332,719 issued Dec. 25, 2001 to Nishikawa et al. and U.S. Pat. No. 8,031,993 issued Oct. 4, 2011 to Bowen, both incorporated herein by reference.

The interposers can be based on substrates made of silicon or some other semiconductor material, and/or glass, metal, and/or other materials. For example, mirrors 144 can be just silicon surfaces or other non-metal surfaces. Mirrors 144 can be at any angle, including a retrograde angle, i.e. an angle greater than 90°. In other words, a mirror surface can overhang the grooves 310 as shown in FIG. 4 for example. In this example, mirror 144 is at an angle of 135° to the horizontal. Horizontal light beam 140 emitted by fiber 140 is reflected by mirror 144 to travel vertically down through substrate 130 to a transducer (not shown) formed in substrate 130 or in another integrated circuit, possibly below the substrate. The mirror surface is a monocrystalline silicon surface of substrate 130. This surface is formed by a novel process including a combination of etching techniques. At least one etch in this combination is a wet etch selective to certain crystal planes of monocrystalline silicon. For example, in some embodiments, substrate 130 is a (100) wafer, and the wet etch can be the same etch selective to {110} planes as described above in connection with FIGS. 1-3. However, the wet etch is preceded by other processing, for example by a dry etch forming vertical sidewalls, so that the wet etch results in the 135° angle shown in FIG. 4.

The 135° angle can be used in a wide variety of MEMS (micro-electro-mechanical systems) including non-optical systems. In FIG. 5, substrate 130 has a cavity 410 with sidewalls at 135° to the horizontal plane. Such a substrate can be used for optical or non-optical purposes. For example, the bottom planar surface of cavity 410 can be a sensor's membrane. The fabrication process of forming the cavity 410 can replace the sensor fabrication process which uses two fusion-bonded wafers and which is described in "The MEMS Handbook" (edited by Mohamed Gad-el-Hak, CRC Press 2001), chapter 16 ("MEMS Fabrication", incorporated herein by reference), section 16.8.2.3.

In some embodiments, the interposer is formed of two interposers. One of the interposers contains the grooves 310, and is inserted into a cavity formed in another interposer.

The invention is not limited to the features and advantages described above except as defined by the appended claims.

BRIEF DESCRIPTION OF THE DRAWINGS

FIGS. 34C, 34D, 34E, 35A, 35B, 35C, 35D, 35E show vertical cross sections of optical interposers during fabrication according to some embodiments of the present invention.

FIG. 35F shows a vertical cross section of a module with an optical interposer with fibers according to some embodiments of the present invention.

FIGS. 43, 44A are top views of optical interposers during fabrication according to some embodiments of the present invention.

FIG. 44B shows a side view of an optical interposer according to some embodiments of the present invention.

FIG. 45 shows a vertical cross section of an optical interposer according to some embodiments of the present invention.

FIG. 46 shows a vertical cross section of an optical interposer with fibers according to some embodiments of the present invention.

DESCRIPTION OF SOME EMBODIMENTS

The embodiments described in this section illustrate but do not limit the invention. The invention is not limited to particular materials, dimensions, process steps, or other features except as defined by the appended claims.

Figure 3:
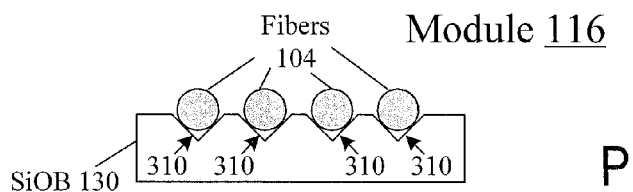
FIG. 3 shows a vertical cross section of a part of the system of FIG. 1.
Figure 6A:
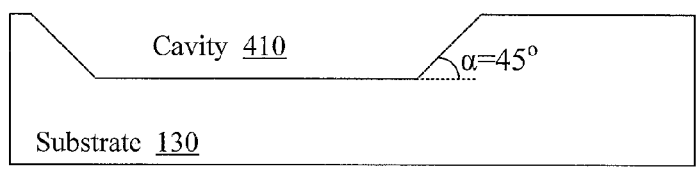
FIGS. 6A, 6B, 6C show vertical cross sections of optical interposers during fabrication according to some embodiments of the present invention.
Figure 6B:
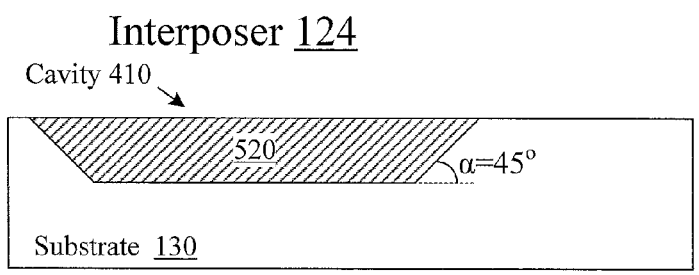
Figure 6C:
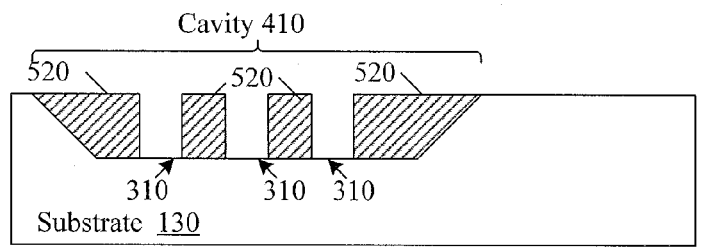

FIGS. 6A-6C illustrate one embodiment of the present invention in the same cross sectional view (transversally to the fibers) as in FIG. 3. In this embodiment, grooves (fiber channels) 310 are formed by two etches as follows:

First, a cavity 410 is etched in substrate 130. This cavity will eventually house all the fibers 104. If desired, the cavity sidewalls can be inclined at 45° or some other angle "α" to provide mirrors (provided by silicon 130 or a separate layer not shown in FIG. 6A) or other elements.

The cavity is then filled with some material 520 (FIG. 6B). Layer 520 is then patterned and etched to form grooves 310 (FIG. 6C). The etch is selective to substrate 130. Due to the etch selectivity, the 45° sidewall providing or supporting the mirrors will not be damaged by the etch even though the sidewall is exposed early during the etch.

In some embodiments, the process is tolerant to misalignment between the cavity mask (the etch mask, not shown, used to form the cavity in FIG. 6A) and the groove mask (not shown) because the cavity mask can be shifted right or left in the view of FIG. 6C relative to the groove mask.

In some embodiments, high depth uniformity is achieved in groove formation for the following reasons. Cavity 410 (FIG. 6A) has a low aspect ratio (height-to-depth ratio), so the etch of cavity 410 can be easily controlled to provide a precise uniform depth throughout the cavity. In some embodiments, the aspect ratio is at most 1:2. The etch of layer 520 can also be easily controlled because this etch is selective to substrate 130 serving as an etch stop. For example, substrate 130 can be silicon, and layer 520 silicon dioxide. Depending on the materials involved, the etch selectivity can be improved by forming an additional etch-stop layer on cavity 410 before deposition of layer 520. In some embodiments, the etch selectivity is at least 2:1.

Further, in some embodiments, the process of FIGS. 6A-6C is easy to integrate with other steps that form conductive lines or other circuitry in or over substrate 130. Such circuitry can be formed between the stages of FIGS. 6B and 6C, i.e. after the deposition of layer 520 before the groove etch. The wafer is flat at this stage, and many conventional processes for circuit fabrication work better on flat wafers. (We will sometimes refer to substrate 130 together with other elements integral with the substrate as a "wafer"; in some embodiments multiple interposers are simultaneously fabricated in the same wafer.) In particular, wafer handling and photolithography work better with flat wafers. The material 520 can be chosen consistently with the processes forming other circuitry. For example, if high temperatures are required by these processes, the material 520 can be chosen to withstand high temperatures. If mirrors 144 (not shown in FIGS. 6A-6C) or other elements need to be formed of non-refractory metal (such as gold), the metal deposition can be postponed until after the high temperature steps.

Figure 7:
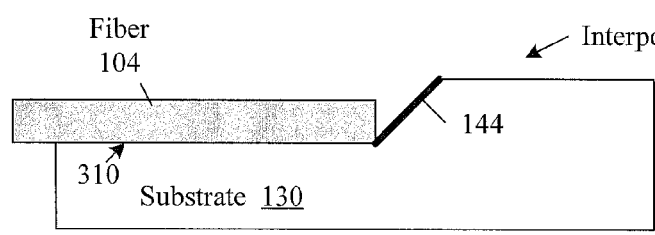
FIG. 7 shows a vertical cross section of an optical interposer with fibers according to some embodiments of the present invention.

FIG. 7 is a view of an interposer 124 with a mirror 144 and a fiber or fibers 104 in a cross section taken along a fiber 104. The fibers are inserted into grooves 310 so that they project beyond the cavity at the interposer's left side. The cavity 410 does not have a sidewall on that side. The cavity is initially formed with the sidewalls on all sides (FIG. 6A), but one side is then removed during dicing of wafer 130. More particularly, one sidewall of cavity 410 is positioned on the wafer's scribe line. This sidewall is removed by the dicing process.

Figure 8:
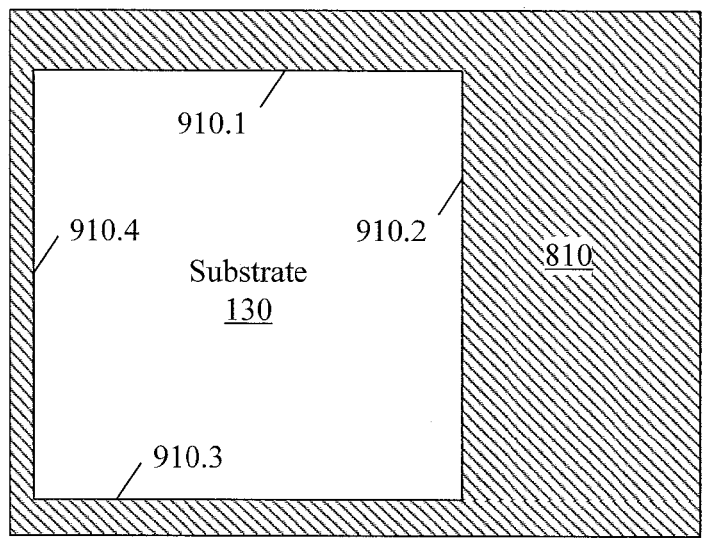
FIG. 8 is a top view of an optical interposer during fabrication according to some embodiments of the present invention.
Figure 9A:
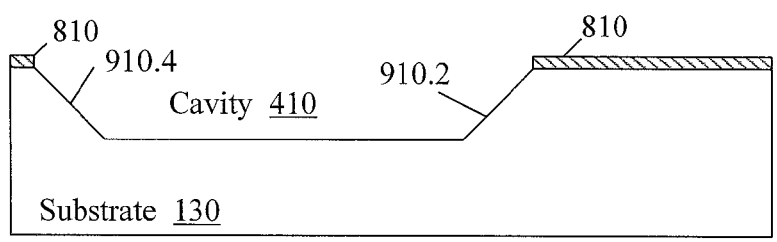
FIG. 9A shows a vertical cross section of an optical interposer during fabrication according to some embodiments of the present invention.
Figure 9B:
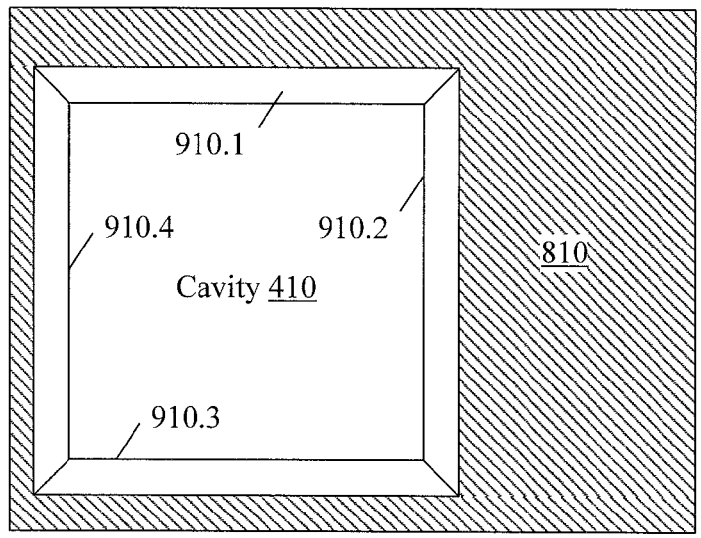
FIG. 9B is a top view of an optical interposer during fabrication according to some embodiments of the present invention.

Other embodiments will now be described. FIG. 8 (top view), FIG. 9A (cross sectional view) and FIG. 9B (top view) illustrate forming cavity 410 in substrate 130 at the beginning stages of fabrication of an optical interposer according to some embodiments of the present invention. FIG. 8 shows the structure before the cavity is formed, and FIGS. 9A and 9B show the structure with the cavity. Substrate 130 can be silicon, silicon on insulator (SOI), glass, metal, or other materials. In some embodiments, substrate 130 is part of a wafer in which multiple interposers are simultaneously fabricated. In an exemplary embodiment discussed immediately below, substrate 130 is monocrystalline silicon having a thickness of 750 μm.

Substrate 130 is initially planar on top and bottom. Cavity 410 is formed by a masked timed etch. More particularly, substrate 130 is cleaned, and a masking layer 810 is deposited on the entire top surface to provide a hard mask. In some embodiments, layer 810 is silicon dioxide thermally grown to an exemplary thickness of 1.0 μm, but other materials (e.g. silicon carbide, silicon nitride, metal, and others) and other fabrication processes can also be used. Layer 810 can also form on the wafer's bottom and sidewall surfaces though this is not shown. (Layer 810 is optional, and can be omitted; the hard mask may or may not be desirable depending on the type of etch used to form the cavity, the cavity depth, the material of substrate 130, and possibly other factors.)

Masking layer 810 is patterned to define cavity 410. See FIG. 8. The photoresist is removed, and substrate 130 is etched through the mask opening to form the cavity. The cavity has a horizontal bottom surface (parallel to the substrate's bottom surface) and sloped sidewalls 910.1 through 910.4 that are inclined at an exemplary angle of 45° to the bottom surface of the substrate. The mirrors will be formed on one or more of these sidewalls, e.g. on sidewall 910.2. (The invention is not limited to a cavity having four sidewalls; the cavity can be non-rectangular in top view, and may have rounded and other shapes.)

An exemplary etch of cavity 410 is an anisotropic wet etch which provides the 45° sidewalls if wafer 130 is a (100)-silicon wafer and the opening in mask layer 810, as shown in FIG. 8, exposes a rectangular region of the top surface of substrate 130 with the sides oriented in the <100> directions of the silicon crystal. A suitable wet etch is the same etch as described above in connection with FIG. 3, i.e. KOH with isopropyl alcohol (IPA) as an additive. The sloped sidewalls 910.1-910.4 are {110} planes, and the etch is selective to such planes as described above. The etch is timed to provide the desired cavity depth. In some embodiments, the cavity depth is 100 μm, and the etching time is about 100 minutes. Other etching processes can also be used. For example, in some embodiments, the etchant is a solution of TMAH (Tetramethylammonium hydroxide) or of EDP (Ethylene-diamine-pyrocatechol).

The etching technique may be chosen based on many factors, such as desired surface morphology (related to roughness of the mirror), the material and thickness of mask 810, etching selectivity to the mask material, parasitic planes size (i.e. the size of undesired planes that may form in substrate 130 during the etch), etching rates, defect density, material cost, process cost, limitations on use and disposal of etching byproducts, and others factors. Example etching techniques include:

Mixture of a inorganic etchant with organic non-ionic surfactant additives:
KOH (10%-40%) plus IPA (Isopropyl Alcohol) to 50% concentration;
KOH (10%-40%) plus NC-series surfactant, which is Poly-oxethylene-alkyl-phenyl-ether (NC-100, NC-200, and NC-300) in range of 0.01% to 0.1%;
KOH (10%-40%) plus NC-1002, in range of 0.001% to 0.1%.

Mixture of organic etcher with organic non-ionic surfactant additives:
EDP (an aqueous solution of ethylene diamine and pyrocatechol) (5-20%) plus IPA to 50%;
EDP (5-20%) plus NC-series surfactant (NC-100, NC-200, and NC-300) in range of 0.01% to 0.1%;
EDP (5-20%) plus NC-1002, in range of 0.001% to 0.1%.

Also:
TMAH (Tetra-Methyl-Ammonium Hydroxide) 5 to 25% plus IPA (Isopropyl Alcohol) to 50% concentration
TMAH 5-25% (e.g. 25% solution in water as provided by Chemical Strategies, Inc. of Anthem, Ariz.) plus Triton X-100 (5-1000 ppm, e.g. 100 ppm);
TMAH 5-25% plus NC-series surfactant (NC-100, NC-200, and NC-300) in range of 0.01% to 0.1%
TMAH 5-25% plus NC-1002, in range of 0.001% to 0.1%.

These examples are not limiting.

The cavity depth can be any suitable value, e.g. 100 to 500 μm or smaller or larger. In some embodiments, the cavity is rectangular, and the dimensions of the cavity's top surface are 2.1 mm along the sidewall 910.1 and 2.0 mm along the sidewall 910.2. The aspect ratio of the cavity is thus about 1:21. The low aspect ratio is desirable to provide a uniform, highly controllable cavity depth. Other shapes, dimensions and aspect ratios can also be used. Different sides of the rectangular opening in mask 810 may have different orientations; in some embodiments, the mirror 144 will be formed on side 910.2, and this side has a <110> orientation when mask 810 is formed, but other sides may have other orientations, and non-rectangular cavities can also be used.

Figure 10:
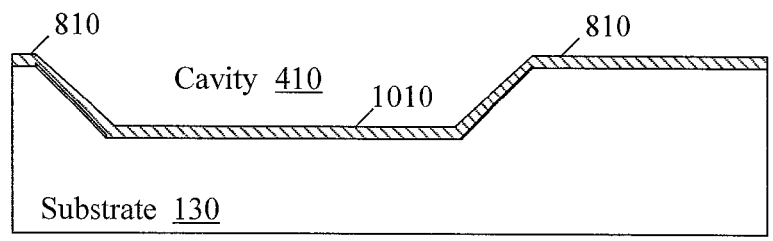
FIGS. 10, 11, 12, 13, 14, 15, 16 show vertical cross sections of optical interposers during fabrication according to some embodiments of the present invention.

Then an optional etch stop layer 1010 (FIG. 10) is deposited over the substrate to provide an etch stop in subsequent etch of layer 520 (FIGS. 6B, 6C). In some embodiments, layer 520 will be polysilicon, and layer 1010 is silicon dioxide thermally grown on silicon substrate 130 to a thickness of 2.0 μm or deposited by CVD (chemical vapor deposition, e.g. from TEOS). The thickness of layer 810 increases in this step.

The material of layer 520 is chosen for compatibility with other fabrication processes that will form circuitry in substrate 130. Polysilicon is desirable for its tolerance to high temperatures such as present in thermal oxidation of silicon. Polysilicon is also easy and inexpensive to deposit. In some embodiments, layer 520 will be used to provide mechanical support for a cantilevered transducer 120 as described below but will not be used to provide semiconductor circuit elements such as transistor regions. Low quality polysilicon and inexpensive deposition methods can therefore be used. In particular, layer 520 can be metallurgical polysilicon formed by LTCVD (Low Temperature Chemical Vapor Deposition). Another possibility is polysilicon deposited by high temperature (1200° C.) CVD. Other processes can also be used. Layer 520 can be amorphous silicon or polysilicon having very small fine size (nano-grain), or can be epitaxially grown silicon, or other kind. Other suitable materials include polyimide and photoresist (especially if high temperatures will not be used). Other materials are also possible.

In embodiments other than discussed immediately below, one or more (possibly all) process steps that form the circuitry in substrate 130 are performed before or during the deposition of layer 520, and the material for layer 520 is chosen based on other considerations. In some embodiments, the material is a polymer, possibly a particulate polymer, e.g. with glass-bead particles for mechanical reinforcement. Metals and other materials can also be used.

Figure 11:
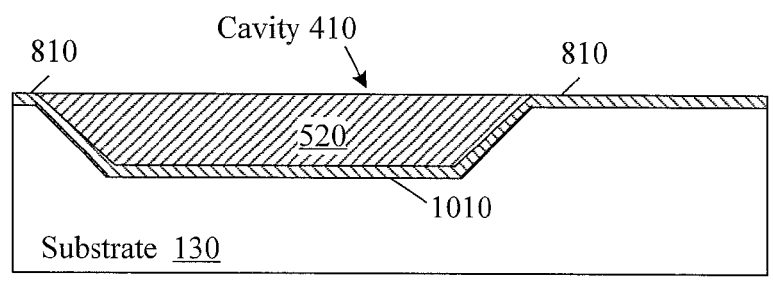

Layer 520 initially covers the whole wafer, but then is polished by chemical mechanical polishing (CMP) stopping on oxide 810. See FIG. 11. Cavity 410 remains filled by layer 520 but layer 520 is removed outside the cavity. In other embodiments, the CMP or other process leaves layer 520 covering the entire wafer, with a planar top surface. (A non-planar top surface is also possible.)

Before etching the layer 520 to form the grooves 310, the wafer is processed to form circuitry for connection to transducer or transducers 120 and possibly for other purposes. The wafer is planar at the stage of FIG. 11, as desirable for many IC fabrication processes. If desired, an additional planar layer (e.g. silicon nitride) can be deposited over the wafer as a protective layer to protect the layer 520.

Figure 1:
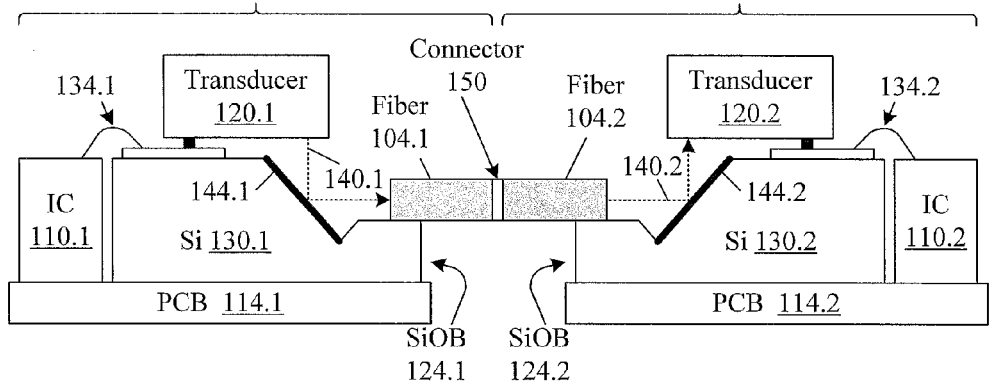
FIG. 1 shows a vertical cross section of an opto-electrical system according to prior art.

The wafer can be processed to create circuitry 134 (FIG. 1) or any other desired circuitry, including for example circuit elements both at the top and the bottom of substrate 130, with through-wafer interconnects between such circuit elements. See for example the following U.S. patents incorporated herein by reference:

U.S. Pat. No. 7,964,508 ("Dielectric trenches, nickel/tantalum oxide structures, and chemical mechanical polishing techniques") issued Jun. 21, 2011 to Savastiouk et al.;

U.S. Pat. No. 7,521,360 ("Electroplating and electroless plating of conductive materials into openings, and structures obtained thereby") issued Apr. 21, 2009 to Halahan et al.;

U.S. Pat. No. 7,241,675 ("Attachment of integrated circuit structures and other substrates to substrates with vias");

U.S. Pat. No. 7,186,586 ("Integrated circuits and packaging substrates with cavities, and attachment methods including insertion of protruding contact pads into cavities");

U.S. Pat. No. 7,060,601 ("Packaging substrates for integrated circuits and soldering methods");

U.S. Pat. No. 7,034,401 ("Packaging substrates for integrated circuits and soldering methods");

U.S. Pat. No. 7,001,825 ("Semiconductor structures having multiple conductive layers in an opening, and methods for fabricating same");

U.S. Pat. No. 6,897,148 ("Electroplating and electroless plating of conductive materials into openings, and structures obtained thereby");

U.S. Pat. No. 6,787,916 ("Structures having a substrate with a cavity and having an integrated circuit bonded to a contact pad located in the cavity").

See also U.S. patent application Ser. No. 13/042,186 filed Mar. 7, 2011; and Ser. No. 13/181,006 filed Jul. 12, 2011, both filed by V. Kosenko et al. and both incorporated herein by reference.

Figure 12:
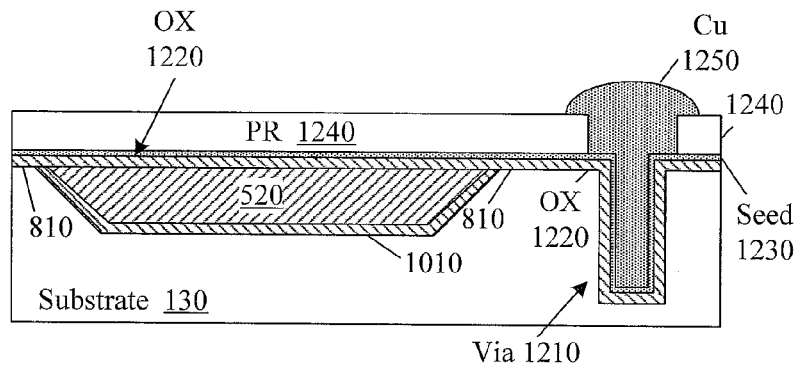

An exemplary process forming such circuitry is as follows. A via 1210 (FIG. 12) is formed in the top surface of substrate 130 at each location of a desired through-substrate via (through-silicon via if the substrate is made of silicon). The via initially does not go through the substrate, but is deeper than the substrate's final thickness (the substrate will be thinned as described below). A silicon dioxide layer 1220 is grown over the substrate by thermal oxidation, at an exemplary temperature of 1100° C. for 160 minutes to an exemplary thickness of 1.0 µm. Layer 1220 also forms on polysilicon 520 unless polysilicon 520 is covered by a protective layer described above in connection with FIGS. 10-11 but not shown in the figures. The thermal oxidation increases the thickness of oxide 810 if this oxide is not covered by the protective layer.

Then a seed layer 1230 (e.g. copper) is sputtered on the wafer for subsequent electroplating. A photoresist film 1240 (e.g. dry-film-resist) is deposited on the wafer and patterned to expose the vias 1210 and adjacent areas. Copper 1250 is electroplated to fill the vias 1210 and protrude above the resist 1240.

Figure 13:
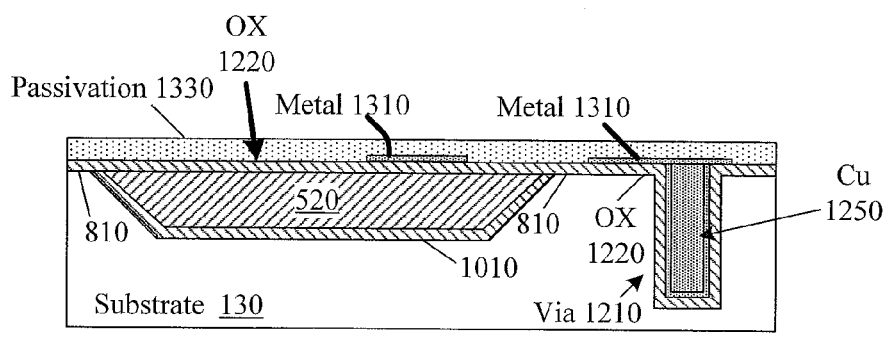

A subsequent stage is illustrated in FIG. 13. More particularly, copper 1250 is polished by CMP to provide a planar top surface. Then resist 1240 is stripped, and copper layers 1250 and 1230 are polished down by CMP to the level of oxide 1220. Oxide 1220 becomes exposed. (Both layers 1250, 1230 remain in vias 1210 but are shown simply at 1250 in some drawings.) Another metal layer 1310 is sputtered on the wafer and patterned photolithographically to form conductive lines that will connect the metalized vias 1210 (i.e. the copper in vias 1210) to transducer contacts and/or other circuit elements (e.g. transistors, resistors, diodes, capacitors, or other elements that can be formed in the interposer). Metal pads 1310 are also formed on oxide 1220 over cavity 1410 to provide mechanical support for cantilevered transducers as described below. These and other metal pads may or may not be part of electrical circuitry and may or may not be connected to other circuit elements. Additional dielectric and metal layers (not shown) can be deposited to create multiple interconnect layers and other circuit elements for circuitry connected to the transducers and for other circuitry. Then a passivation layer 1330 (e.g. polyimide) is formed to cover the top side of the wafer.

Figure 14:
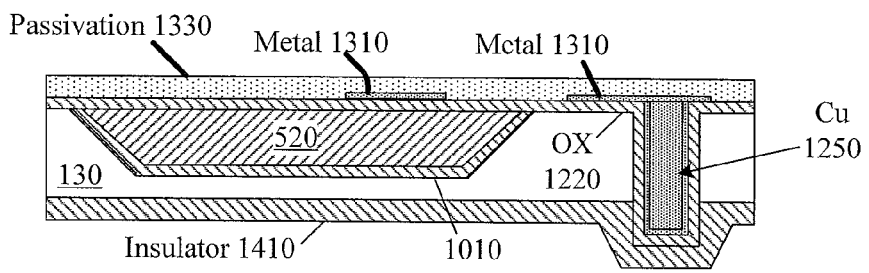
Figure 15:
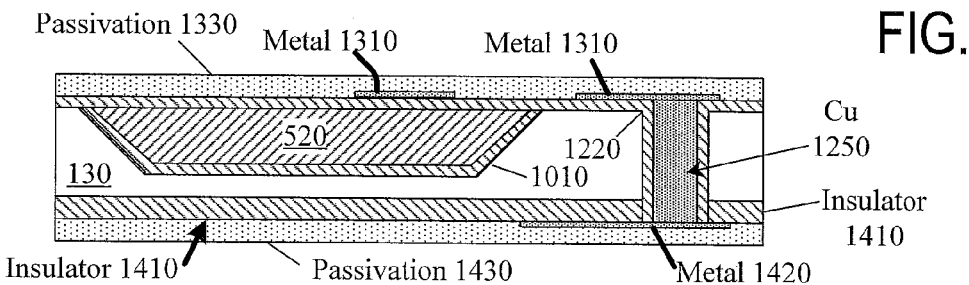

Then (FIG. 14) the wafer is thinned to turn the vias 1210 into through-vias (through holes). Copper 1250 (and 1230) and insulator 1220 protrude down from substrate 130. Then insulator 1410 (e.g. polyimide) is deposited on the bottom surface, and the bottom surface is planarized by CMP which does not remove all of insulator 1410 but exposes the copper. See FIG. 15.

Metal 1420 (e.g. copper) is deposited (e.g. by physical vapor deposition, "PVD") on the bottom surface of the wafer. Metal 1420 is patterned photolithographically to provide interconnect lines for connecting the metalized vias to a controller chip (shown in FIGS. 22A, 22B) that will control the transducers 120, and possibly to provide other interconnect lines or other circuit elements. Other interconnect layers (not shown) and other circuit elements (e.g. transistors, diodes, resistors, capacitors, etc., not shown) can also be formed at the bottom.

A passivation layer 1430 (e.g. polyimide) is deposited on the bottom surface and is patterned photolithographically to form contact openings exposing the metal 1420. See FIG. 16. The exposed portions of metal 1420 form contact pads that can be soldered or otherwise attached to the controller chip or other circuits.

Figure 16:
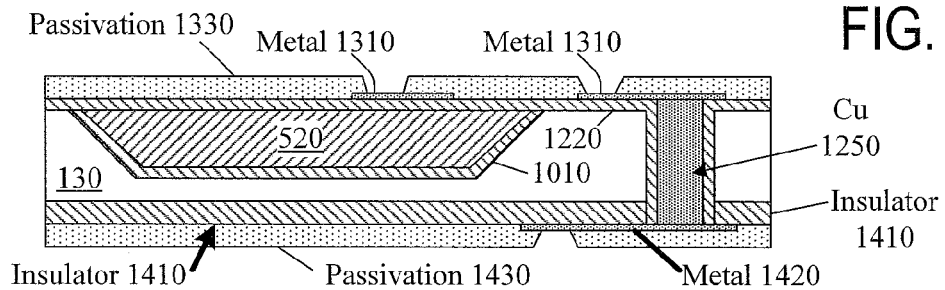
Figure 17A:
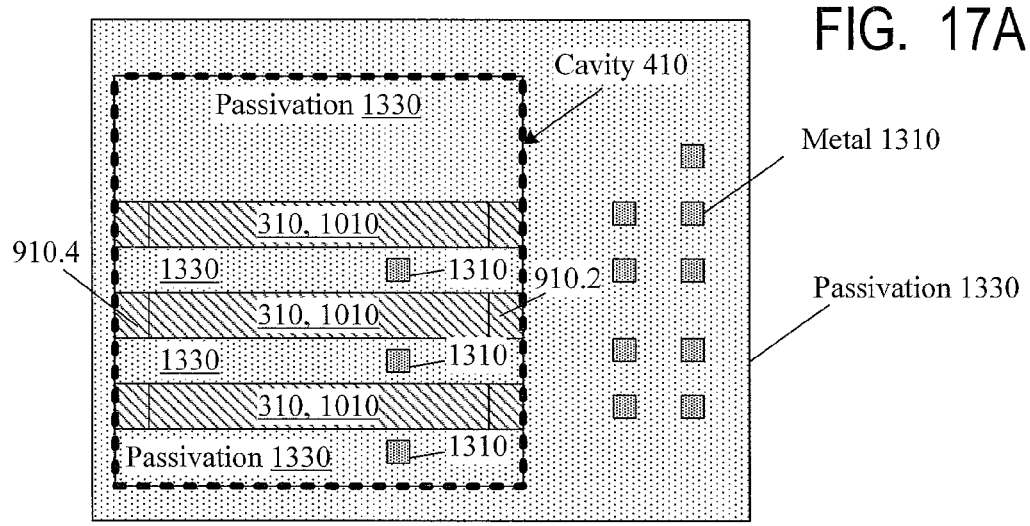
FIG. 17A is a top view of an optical interposer during fabrication according to some embodiments of the present invention.
Figure 17B:
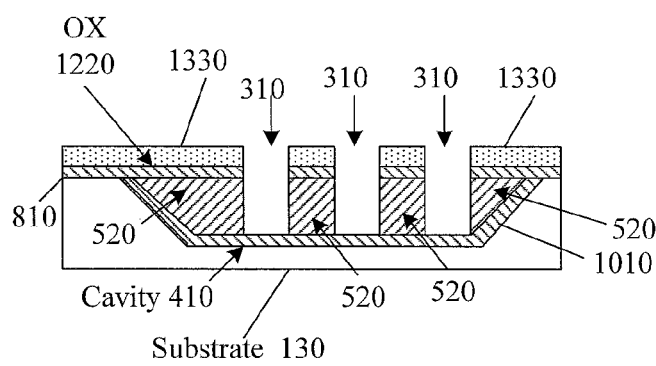
FIG. 17B shows a vertical cross section of an optical interposer during fabrication according to some embodiments of the present invention.

The top surface of the wafer is then processed to form contact openings to metal 1310 and to form grooves 310. FIG. 17A is a top view of the resulting structure, and FIG. 17B shows the wafer's cross section perpendicular to the grooves. For example, in some embodiments, the wafer is covered with photoresist (not shown), and the photoresist is patterned to define grooves 310 and the contact openings to metal 1310 (FIG. 16). Passivation 1330 is etched away through the photoresist openings over the grooves to be formed and in the contact openings. Oxide 1220 becomes exposed over the grooves 310. (Alternatively, the etch of passivation 1330 can remove the oxide 1220 over the grooves and expose the layer 520). After the etch of passivation 1330, the photoresist is removed, and another photoresist layer (not shown) is deposited and patterned to define the grooves 310. If oxide 1220 was not removed over the grooves, it is removed at this time to expose layer 520 in the grooves. Layer 520 is etched selectively to the photoresist and to layer 1010 to form the grooves and expose the layer 1010. In this embodiment, the groove sidewalls are vertical, but non-vertical sidewalls are formed in other embodiments. In this embodiment, layer 520 is polysilicon etched by DRIE (deep reactive ion etch), possibly the Bosch process, and layer 1010 is silicon dioxide. The etch selectivity of polysilicon to silicon dioxide is at least 100:1. Other fabrication processes and selectivity values can also be used.

Exemplary dimensions that can be achieved for rectangular grooves 310 with monocrystalline substrate 130 and polysilicon spacers 520, using silicon oxide 1010 as an etch stop, are as follows: the groove width is 135 µm; the groove pitch (the distance between the centers of adjacent grooves) is 250 µm; the groove depth is 100 µm. In some embodiments with rectangular grooves, a suitable groove width is 50 to 1000 µm, the groove pitch is 150 to 2000 µm, and the groove depth is 100 to 500 µm. Other ranges are also possible.

A reflective layer (e.g. aluminum, gold, or some other metal) with desired reflectivity properties is deposited and patterned to form mirrors 144 (FIG. 18) at the grooves' ends on the cavity sidewall 910.2. In some embodiments, the mirrors are formed by depositing a stack of layers with different refractive indices. In some embodiments, the mirrors are initially formed on a separate substrate (not shown), but then are released from that substrate and are attached to sidewall 910.2 by adhesive. For example, in some embodiments, a stack of layers is formed on the separate substrate as follows: a polysilicon layer is deposited, is covered with a dielectric layer (e.g. thermally grown silicon dioxide), then a 2 nm to 5 nm chromium adhesion layer is formed on the dielectric, and finally a 500 nm layer of gold, aluminum or silver is formed on the chromium layer to provide a reflective mirror layer. If silver is used, then an additional transparent layer can be formed on the silver to protect the silver from oxidation. Then this stack of layers is released from the separate substrate and is glued to sidewall 910.2.

Figure 18:
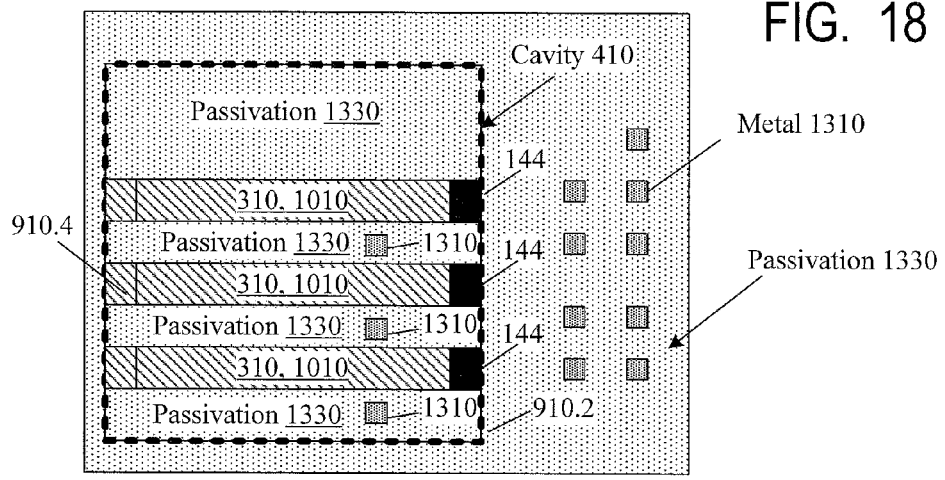
FIGS. 18, 19 are top views of optical interposers during fabrication according to some embodiments of the present invention.
Figure 19:
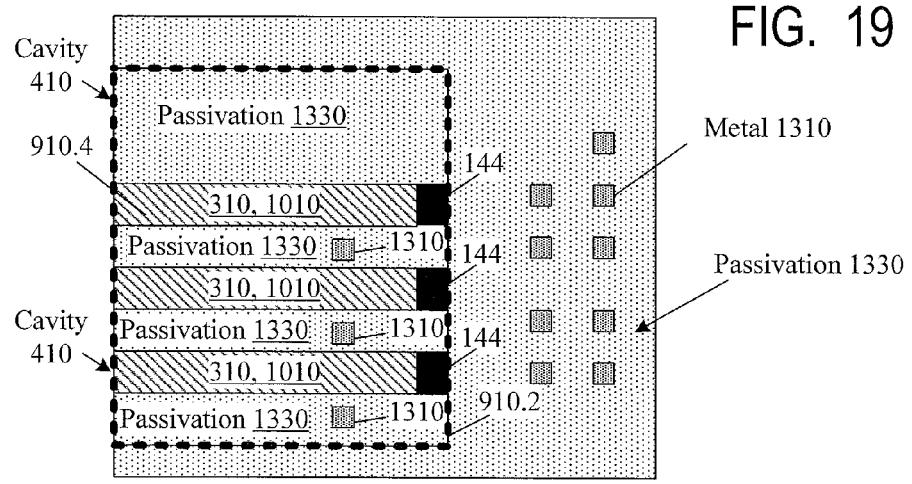
Figure 20:
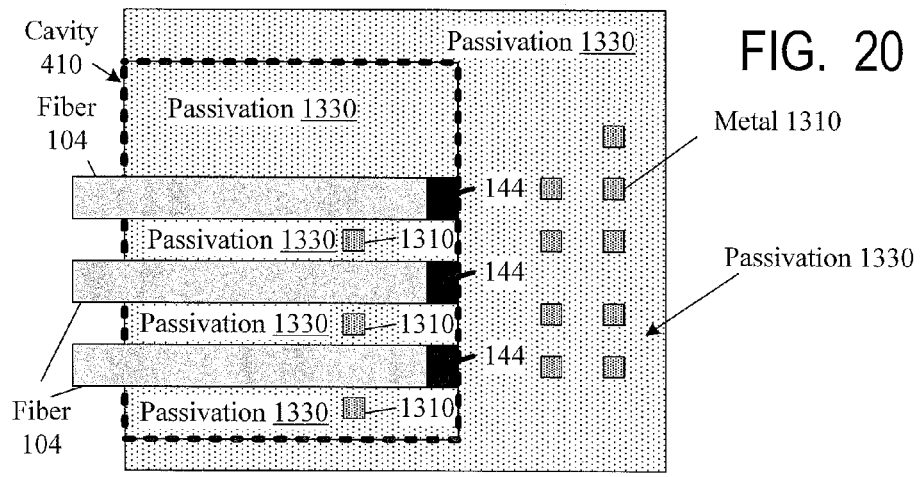
FIG. 20 is a top view of an optical interposer with fibers according to some embodiments of the present invention.
Figure 21:
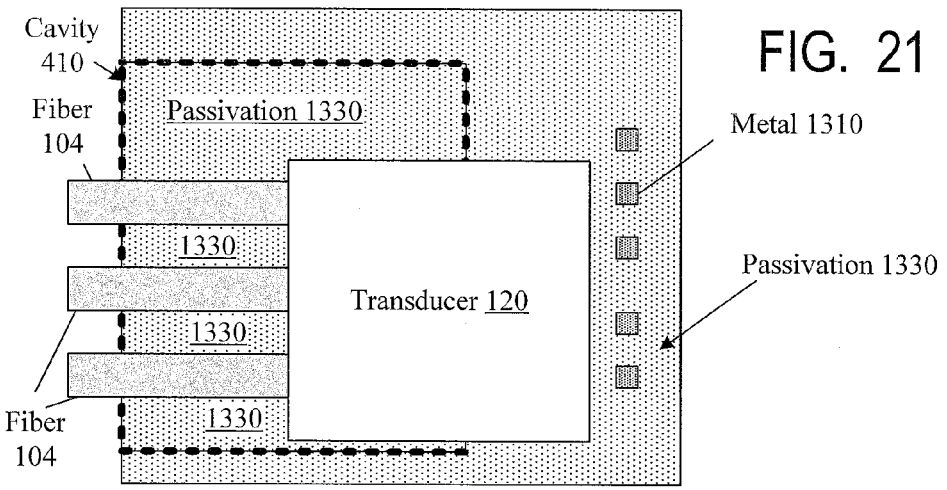
FIG. 21 is a top view of a module with an optical interposer according to some embodiments of the present invention.
Figure 22A:
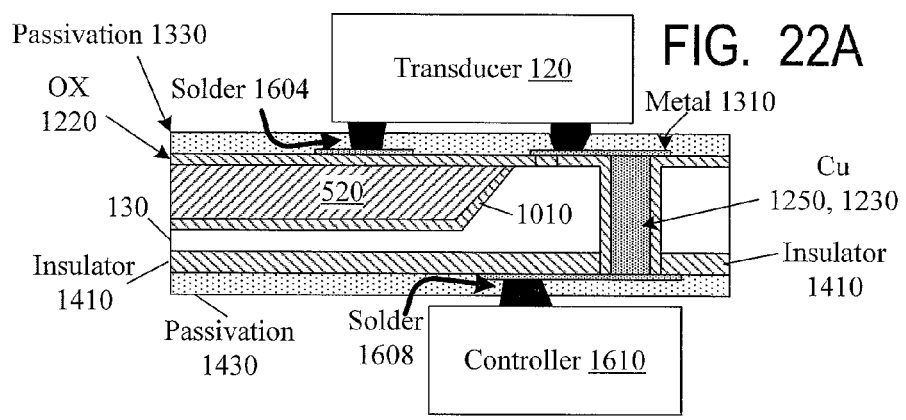
FIGS. 22A, 22B, 23A, 23B, 23C, 23D, 23E show vertical sections of modules with optical interposers according to some embodiments of the present invention.
Figure 22B:
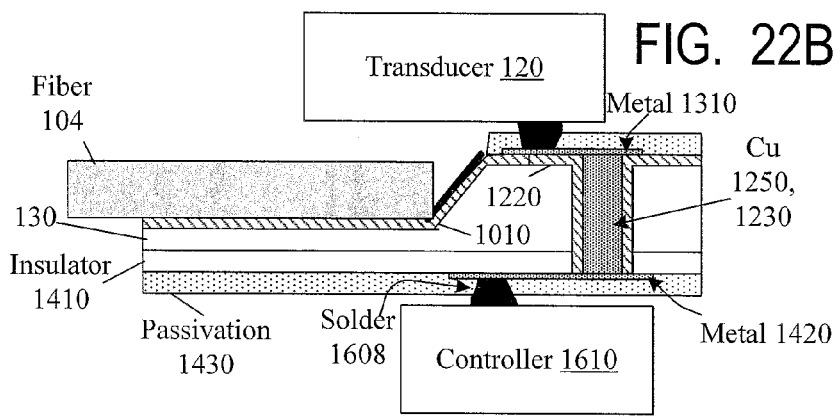

When mirror fabrication has been completed, the wafer is diced. In the embodiment of FIG. 18, the left sidewall 910.4 of cavity 410 is on a dice line, so the sidewall 910.4 is removed. See FIG. 19. The grooves 310 become exposed on the left for fiber insertion. Fibers 104 are inserted into the grooves as shown in FIG. 20. Transducer 120 and possibly other circuits are connected to the interposer (to metal contacts 1310, 1420). In the exemplary embodiment of FIGS. 21, 22A, 22B, transducer 120 is flip-chip attached to the top contacts 1310 of the interposer with solder 1604 or some other means, and controller 1610 is flip-chip attached to the bottom contacts 1420 with solder 1608 or some other means. FIG. 21 is the top view; FIG. 22A shows a longitudinal cross section along a spacer 520/1220/1330 between adjacent grooves 310; FIG. 22B shows a cross section along a fiber 104. Multiple transducers, controllers, and other integrated circuits and discrete circuit elements can be connected to the interposer. As seen in FIG. 22A, solder 1604 is also placed on metal 1310 over polysilicon spacers 520 to provide mechanical support for supporting cantilevered transducer chip or chips 120 or other circuits that may overly the cavity 410. The transducer size can therefore be increased without increasing the stress on the transducer and without increasing the overall area of the module.

The module can be mounted on a PCB or in any other desired way.

Figure 23A:
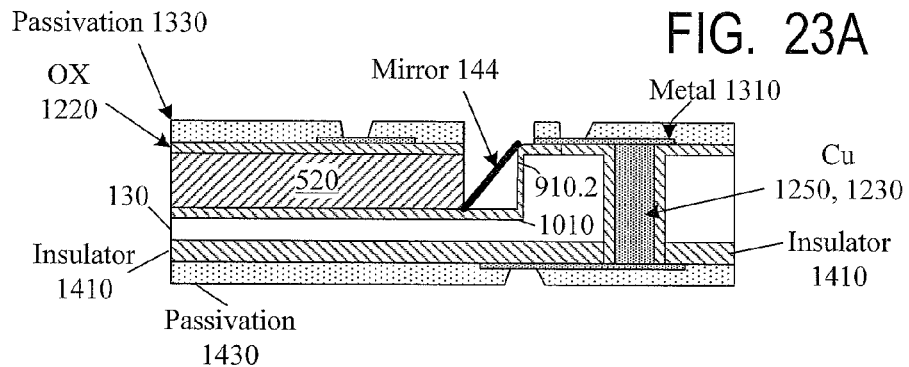
Figure 23B:
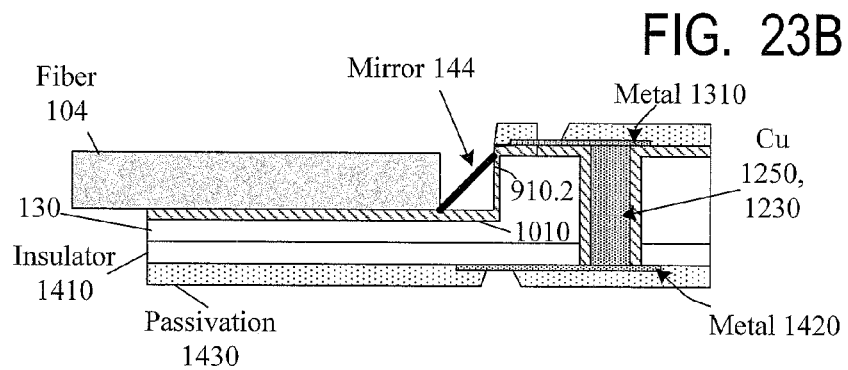

As noted above, mirrors 144 can be initially manufactured on a separate substrate (such mirrors are called "separately made" below). In some embodiments, the separately made mirrors be mounted at a 45° angle, or some other angle, independently of the cavity sidewall angles. Some embodiments are illustrated in FIGS. 23A, 23B. These figures show vertical cross sections by the same cross sectional planes as in FIGS. 22A, 22B (i.e. passing through a spacer 520 and a fiber 104 respectively). The transducer and the controller are not shown for simplicity. The cavity sidewall 910.2 is vertical, but could be at any angle greater than or equal to 45°, including for example a retrograde angle as in FIG. 4. Substrate 130 can be a silicon wafer of any crystal orientation, or can be polysilicon or a non-silicon material. The fabrication process can be essentially as described above in connection with FIGS. 6A-22B. Spacers 520 are spaced from cavity sidewall 910.2 to leave room for the mirrors—this spacer geometry can be provided by the spacer etch of FIG. 6C or 17A-17B or by spacer patterning at any other suitable stage. The mirrors 144 can be a single continuous separately-made reflective strip supported by the top edge of sidewall 910.2 and the bottom edge of spacers 520. Mirror strip 144 is fixed in place by adhesive for example. The cavity may include extensions (not shown) adjacent to the minor, e.g. dog-bone extensions at the cavity sides 910.1, 910.3, to facilitate mirror placement into the cavity.

The mirrors in different grooves 310 can be provided by multiple strips rather than a single strip.

Figure 23C:
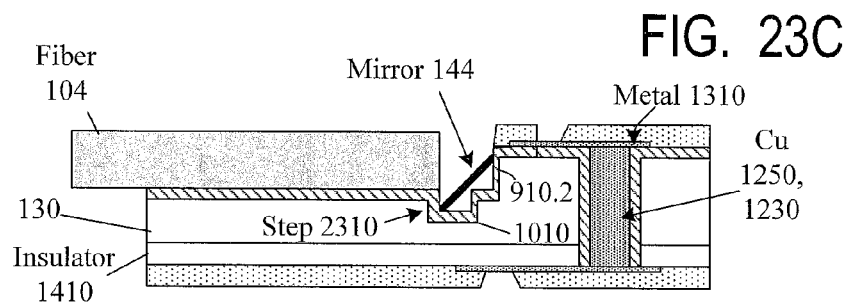

In FIG. 23C (vertical cross section along a fiber 104), the mirror is supported at the bottom by a step 2310 in the bottom surface of cavity 410. The step can be formed using a suitable etch of substrate 130.

Figure 23D:
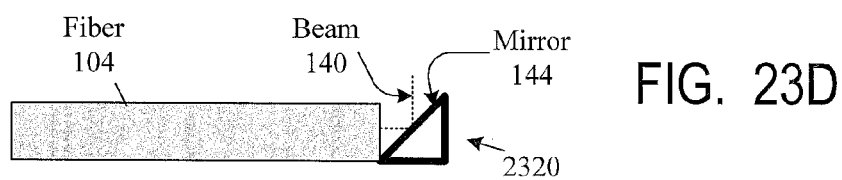
Figure 23E:
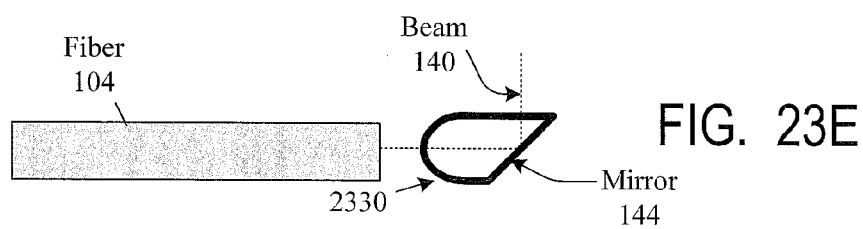

A separately made mirror 144 may be a surface of a three-dimensional shape such as a pyramid 2320 (see FIG. 23D showing a vertical cross section along a fiber). In this embodiment, the mirror is the fiber-facing surface of the pyramid. In FIG. 23E (a vertical cross section along a fiber), the mirror is the back surface of a collimating lens 2330 which collimates the beam 140 going out of the fiber 104. The beam may also travel in the opposite direction. Other mirror structures and optical elements can also be provided.

Figure 24:
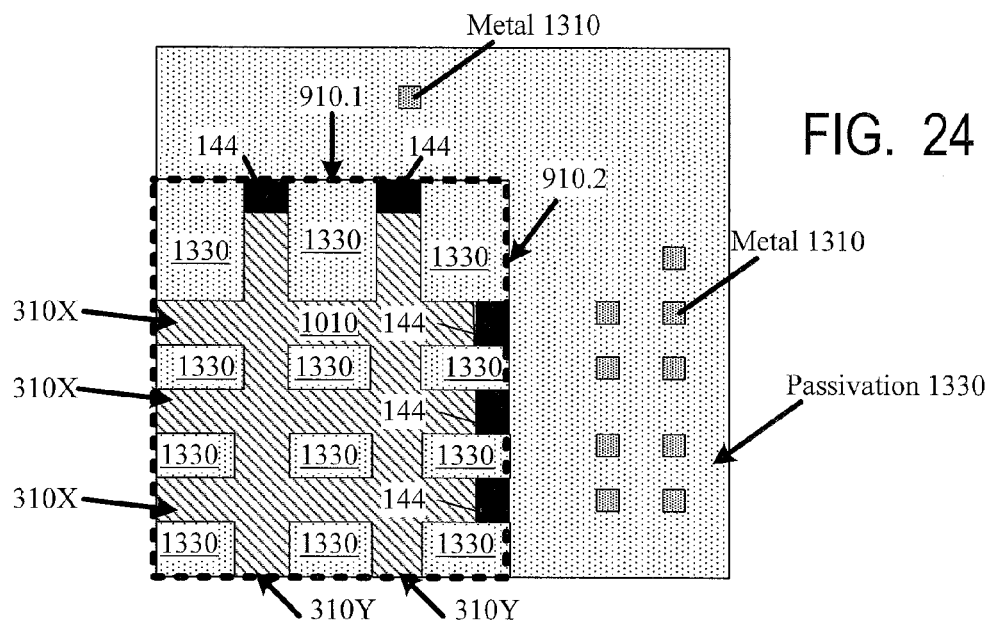
FIG. 24 is a top view of an optical interposer according to some embodiments of the present invention.
Figure 25:
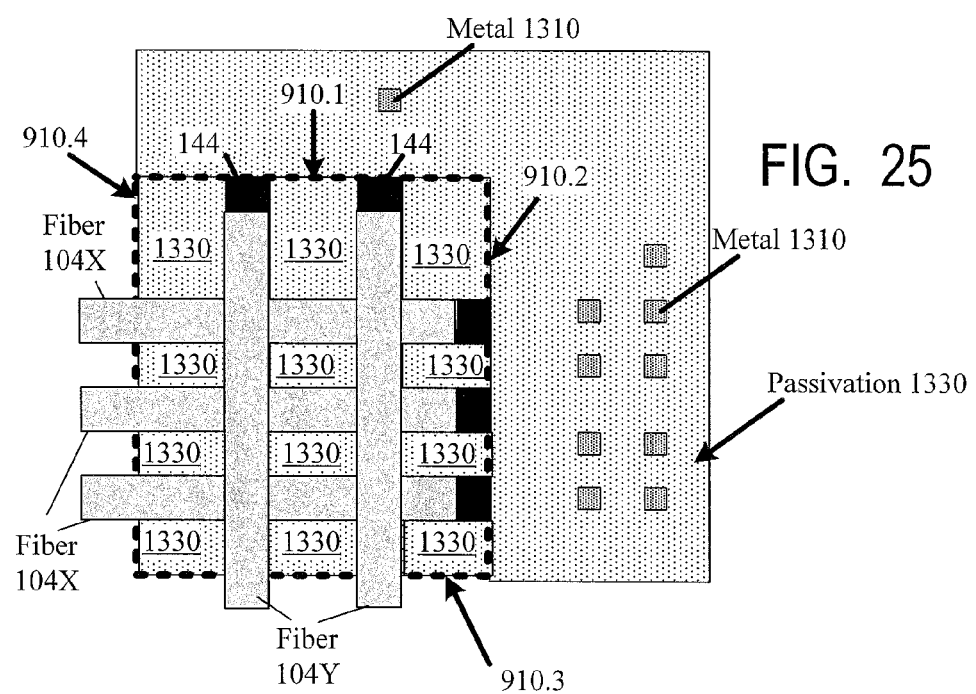
FIG. 25 is a top view of an optical interposer with fibers according to some embodiments of the present invention.
Figure 26:
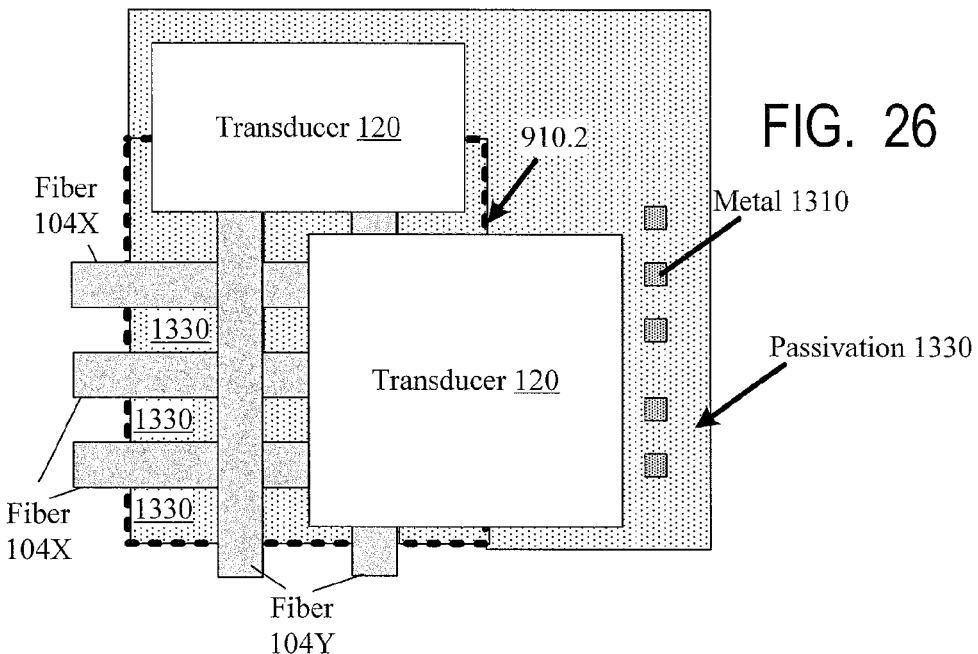
FIG. 26 is a top view of a module with an optical interposer according to some embodiments of the present invention.

To reduce thermal stresses during fabrication and operation, the materials used in the interposer should preferably have similar thermal expansion coefficients, e.g. substrate 130 can be monocrystalline silicon and spacers 520 can be polysilicon. Also, to reduce thermal and other mechanical stresses during operation, each spacer 520 can be made discontinuous and/or hollow. In addition, discontinuous spacers can define multiple channels overlying each other, as illustrated in FIG. 24 (top view without fibers and transducers), FIG. 25 (top view with two layers of fibers 104 but without transducers), and FIG. 26 (top view with two layers of fibers 104 and two transducers 120). In FIGS. 25 and 26, contacts 1310 between the grooves are not shown for simplicity. Grooves 310X and fibers 104X run in the X direction (horizontally in the view of FIGS. 24-26) between the spacers. Grooves 310Y and fibers 104Y run in the Y direction over the fibers 104X. Mirrors 144 on side 910.2 are for the bottom fibers 104X. Mirrors 144 on side 910.1 are for the top fibers 104Y. Cavity sidewalls 910.3, 910.4 are removed during dicing or at some other processing stage.

Figure 27A:
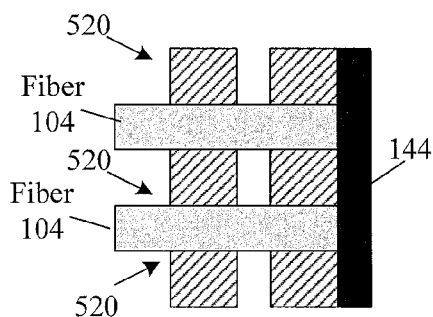
FIGS. 27A, 27B, 27C are top views showing some features of optical interposers with fibers according to some embodiments of the present invention.
Figure 27B:
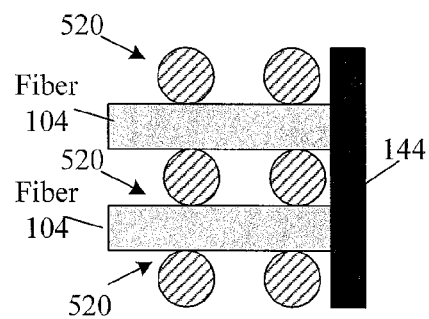
Figure 27C:
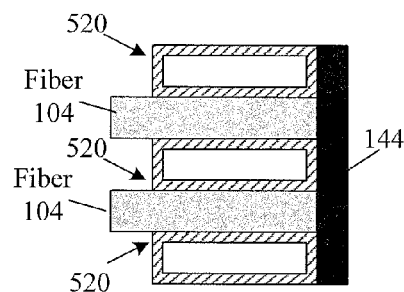
Figure 27D:
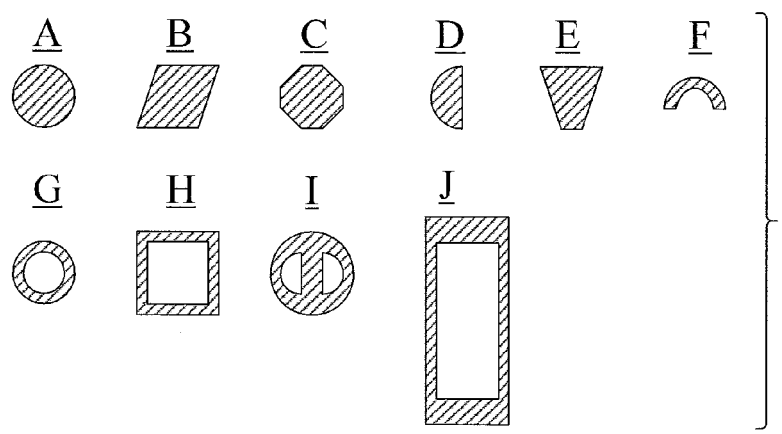
FIG. 27D shows possible spacer shapes in top view for optical interposers according to some embodiments of the present invention.

Thermal reliability can be improved by using discontinuous or hollow spacers as they are less vulnerable to thermal stresses. They can be formed of metal or other materials. They may have any desired shape. FIGS. 27A, 27B, 27C are top views of some embodiments of cavity 410 with continuous and discontinuous spacers 520 and with fibers. (In these embodiments, mirrors 144 merge into a continuous layer on the cavity sidewall; the spacers do not overly the sidewall.) FIG. 27A shows discontinuous rectangular spacers. FIG. 27B shows discontinuous circular spacers. FIG. 27C shows continuous hollow spacers. FIG. 27D shows some non-limiting examples of individual spacers in top view: A (round spacer, as in FIG. 27B), B (parallelogram), C (hexagon), D (half-circle), E (trapezoid), F (half-ring), G (full ring), H (hollow rectangle), and I (hollow circle with a diameter). Spacer J is another hollow rectangle, but the spacer is continuous, i.e. running through the whole cavity (as in FIG. 27C). Other shapes can also be used. In side view, the spacers' sidewalls can be vertical or inclined, and can have conical or other shapes.

Figure 28:
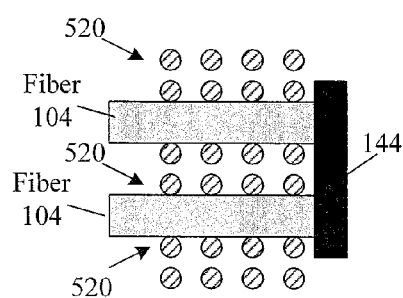
FIG. 28 is a top view showing some features of an optical interposer with fibers according to some embodiments of the present invention.

In FIG. 28 (top view), spacers 520 between each pair of fibers 104 form a double row of discontinuous spacers.

Figure 29:
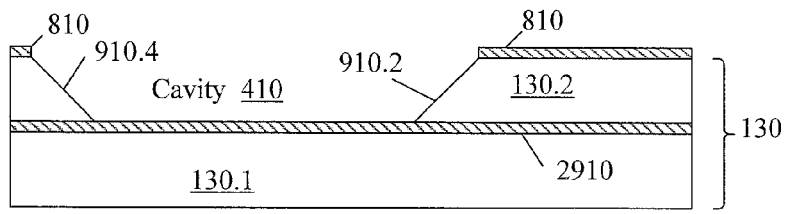
FIGS. 29, 30 show vertical cross sections of optical interposers during fabrication according to some embodiments of the present invention.
Figure 30:
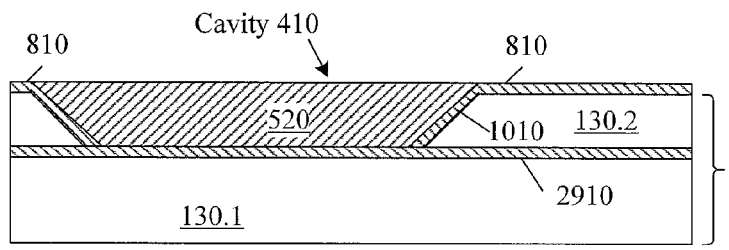

FIGS. 29-30 illustrate use of SOI (silicon on insulator) substrate 130, having monocrystalline silicon layers 130.1, 130.2 separated by planar insulating layer 2910. Layer 2910 can be silicon dioxide, silicon nitride, a polymer, or any other suitable material, possibly a combination of different materials. The fabrication process is similar to the processes described above. FIGS. 29-30 show the same views, and the same stages of fabrication, as respective FIGS. 8, 11. The etch of cavity 410 stops on insulator 2910, and so will the etch of grooves 310 (described above in connection with FIG. 17B). Highly controllable cavity depth is achieved. In some embodiments, layer 130.2 has (100) orientation, the openings in mask 810 are rectangular with <100> sides, and the cavity etch is a KOH wet etch described above that forms 45° sidewalls.

Figure 31:
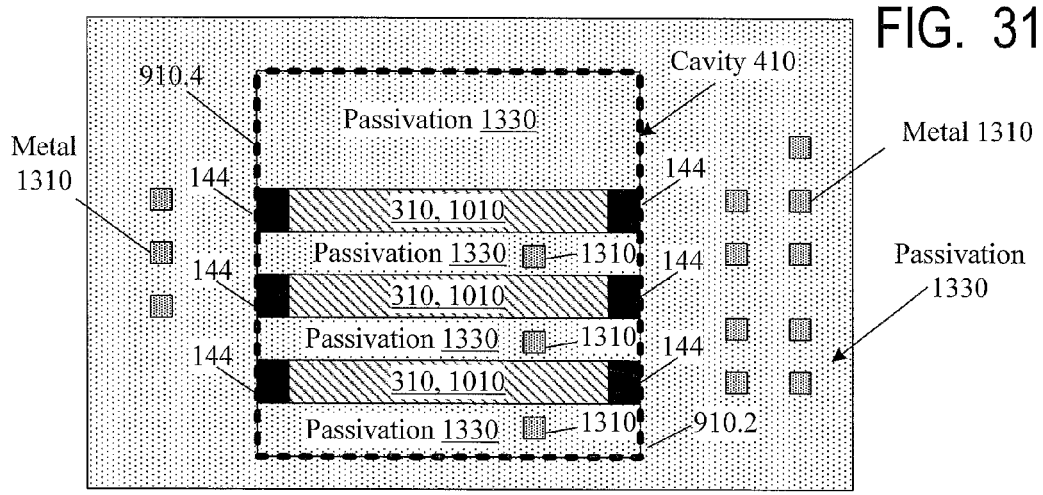
FIG. 31 is a top view of an optical interposer according to some embodiments of the present invention.

Some interposer embodiments are used for optical coupling between different transducers mounted on the same interposer. For example, FIG. 31 is similar to FIG. 18, but minors 144 are formed at the groove ends on cavity sidewalls 910.2, 910.4. Transducers (not shown) can be mounted on the interposer over all these minors, and can be optically coupled to each other by the optical fibers 104. Likewise, in a variation of FIG. 24, mirrors and transducers can be provided on all the four cavity sides 910.1-910.4.

A single transducer chip may have both light emitters and photodetectors. The grooves can be curved in the top and/or side views, and can have a varying width. The minors 144 can be provided by the surfaces of substrate 130, or can be absent since mirrors can be etched into fibers' end faces as described in U.S. Pat. No. 8,031,993 issued Oct. 4, 2011 to Bowen. The minors 144, when present, can be planar as described above, or can be elliptic or have other shapes. Non-minor optical elements (e.g. prisms, etc.) can also be used.

Figure 32A:
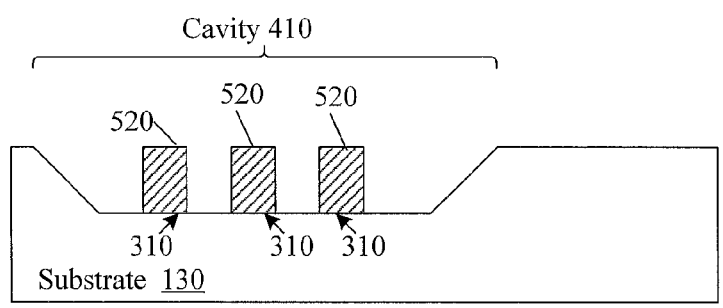
FIGS. 32A, 32B, 32C, 33A, 33B, 33C, 33D, 33E, 34A show vertical cross sections of optical interposers during fabrication according to some embodiments of the present invention.
Figure 32B:
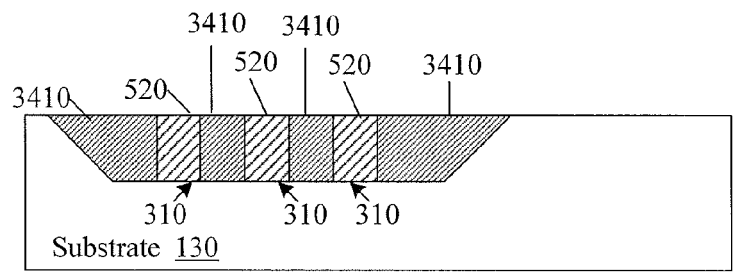
Figure 32C:
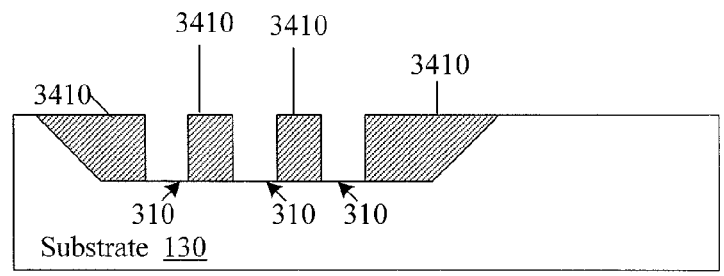

The spacers can be formed by a subtractive method as shown in FIGS. 32A-32C. FIG. 32A is similar to FIG. 6C, but layer 520 is patterned to remain at the groove locations, i.e. in regions complimentary to the spacer locations. The patterning uses a selective etch as in FIG. 6C. Then the gaps between the features of layer 520 are filled with a material 3410 (FIG. 32B). This can be any material suitable for the spacers, deposited by any suitable process, e.g. metal deposited over the wafer and then etched off to provide a planar top surface. Other techniques can also be used, e.g. electrodeposition on a seed layer (not shown) formed in the cavity before deposition of layer 520. Then layer 520 is etched away selectively to layer 3410 (FIG. 32C) to form the grooves 310. Layer 3410 provides the spacers between the grooves. The subtractive method can be used with an etch-stop layer such as 1010 (FIG. 17B) and can be combined with other features described above.

Figure 33A:
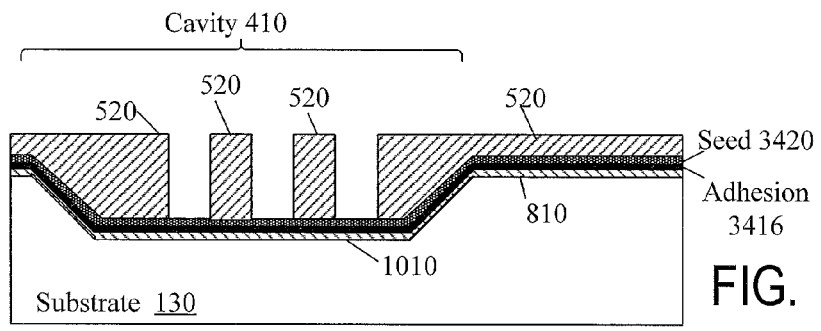

For example, in some embodiments, the wafer is processed as described above in connection with FIGS. 8, 9A, 9B, 10. Then a seed layer 3420 (FIG. 33A) is deposited on the wafer for electroplating. The material, thickness and deposition method of the seed layer will depend on the material 3410 to be later electroplated. In some embodiments, seed 3420 and layer 3410 are the same material, e.g. metal, and the seed layer is deposited by sputtering or chemical vapor deposition (CVD). In some embodiments, an adhesion layer 3416 is formed on the wafer before the seed layer deposition. For example, if the seed layer is nickel, tungsten, copper, aluminum, titanium, or their alloys (e.g. a nickel-tungsten alloy) the adhesion layer can be titanium or chromium deposited by sputtering or evaporation to a thickness of 2.5 nm to 100 nm.

Figure 33B:
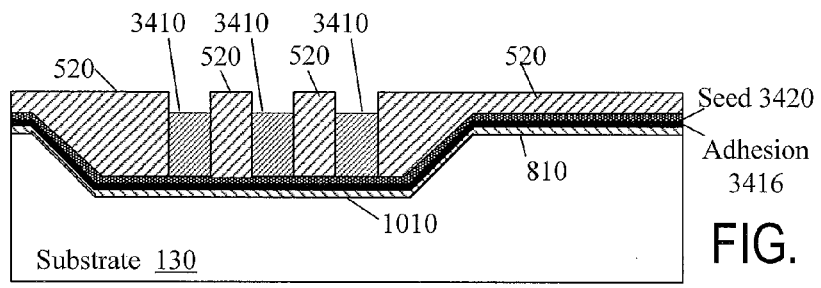
Figure 33C:
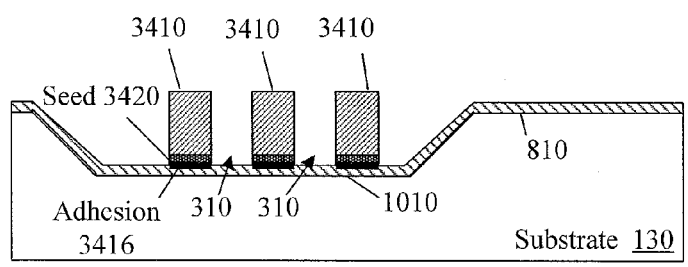

Layer 520 is then deposited on the wafer and is patterned as described above in connection with FIG. 32A. Any suitable material can be used as described above. In an exemplary embodiment, layer 520 is photoresist covering the whole wafer except where it is removed by patterning. Then layer 3410 (FIG. 33B) is electroplated on the exposed portions of seed layer 3420. In some embodiments, electroplating terminates when the top surface of layer 3410 is below the top surface of layer 520 but this is not necessary. Layer 520 is removed from the wafer (FIG. 33C). Optionally, seed layer 3420 and possibly adhesion layer 3416 are removed from the wafer areas not covered by spacers 3410. (In some embodiments, layer 520 is not removed outside the grooves, and thus layer 520 remains at the left and right cavity edges to the left and right of grooves 310 in the view of FIG. 33C.)

Figure 33D:
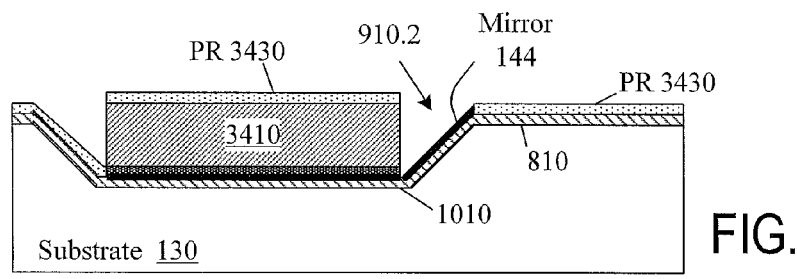
Figure 33E:
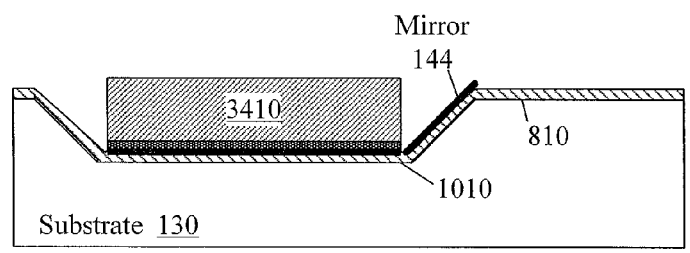

Then mirrors 144 are formed by any of the processes described above. FIG. 33D shows an exemplary vertical cross section along a spacer 3410. In the example of FIG. 33D, the mirrors are formed by a lift-off method. In this example, spacers 3410 do not extend over the sloped sides 910 of cavity 410 in order to obtain a planar top surface in layer 3410 in the electroplating process (at the stage of FIG. 33B). The lift-off method uses a photoresist layer 3430 deposited and patterned to define the mirrors. In this embodiment, the photoresist is patterned to expose the entire cavity side 910.2. Then layer 144 is deposited on the wafer, and then the photoresist 3430 is removed. Layer 144 covers the entire side 910.2. FIG. 33E shows a vertical cross section of the resulting structure along a spacer 3410.

Other circuit elements, e.g. metalized vias as in FIG. 22A, can be formed before the etch of cavity 410 or at any other suitable stage.

Figure 34A:
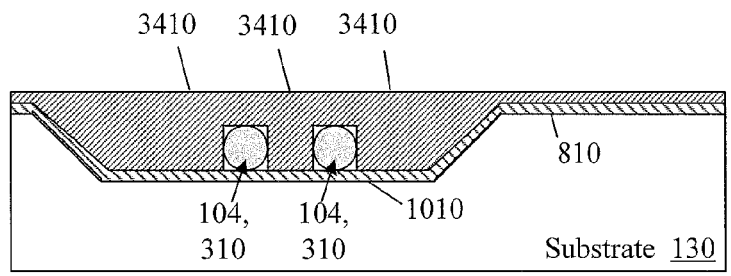
Figure 34B:
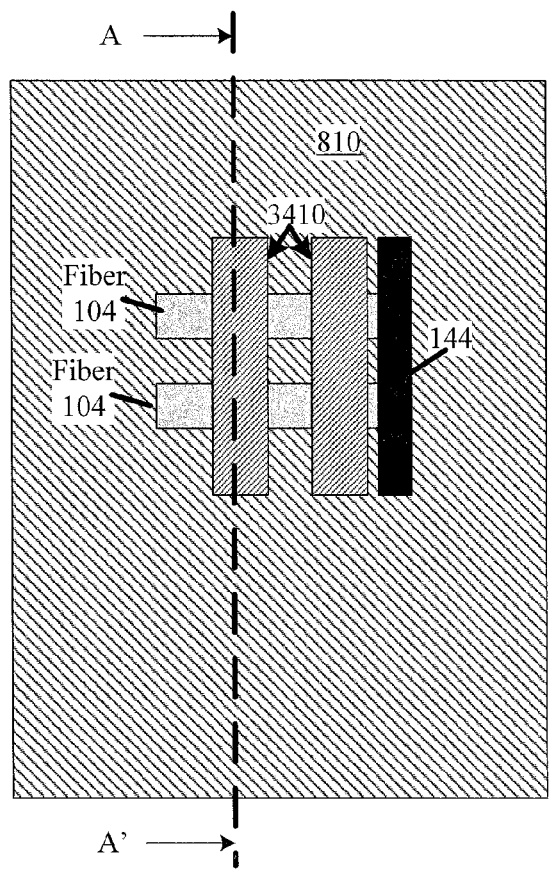
FIG. 34B is a top view showing some features of an optical interposer with fibers according to some embodiments of the present invention.

The spacers can partially or completely cover the fibers 104 as shown in FIGS. 34A and 34B. FIG. 34B is a top view, and FIG. 34A is a vertical cross section perpendicular to the fibers, along the line A-A' marked in FIG. 34B. Metalized vias and other circuitry are not shown. The spacers are shown at 3410 (the invention is not limited to any reference numerals). In the top view of FIG. 34B, the spacers 3410 form stripes perpendicular to the fibers, but in other embodiments the spacers 3410 have other geometry, and in some embodiments form a single, continuous structure overlying the cavity, with channels 310 for the fibers. Separate stripes as in FIG. 34B or other discontinuous spacer shapes can be helpful for thermal stability and for facilitating insertion of fibers 104 into fiber channels 310.

Figure 34C:
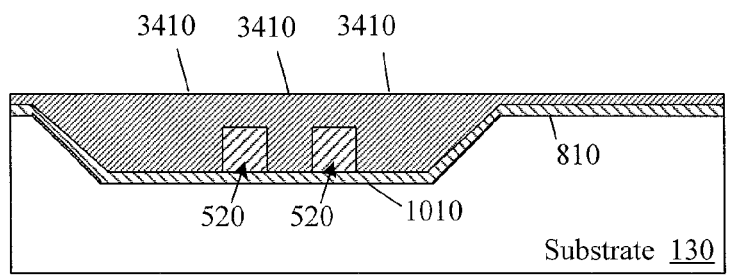

FIG. 34C (vertical cross section by the same plane as in FIG. 34A) illustrates an exemplary method of fabrication. The spacers are formed by a subtractive method as in FIGS. 32A-32C. For example, in some embodiments, the wafer is processed as in FIGS. 8, 9A, 9B, 10 to form cavity 410 with layers 810, 1010. Then a layer 520 is deposited and patterned to remain at the locations of fiber channels 310. Then layer 3410 is deposited to cover the layer 520 and to form spacers between the features of layer 520. In particular, layer 3410 can be patterned to form stripes as in FIG. 34B or other discontinuous shapes. Also, layer 520 can be formed to extend into selected areas between the channels 310 to prevent formation of spacers 3410 in such areas.

After formation of layer 3410, layer 520 is removed from over cavity 410 (and possibly elsewhere) by a wet etch to obtain the structure of FIG. 34A. Layer 3410 can be patterned before or after removal of layer 520.

Figure 34D:
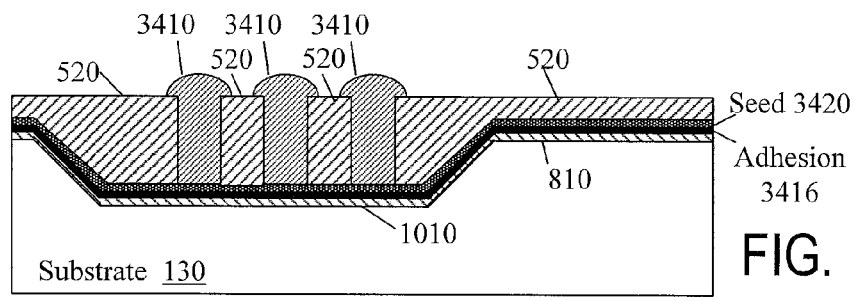
Figure 34E:
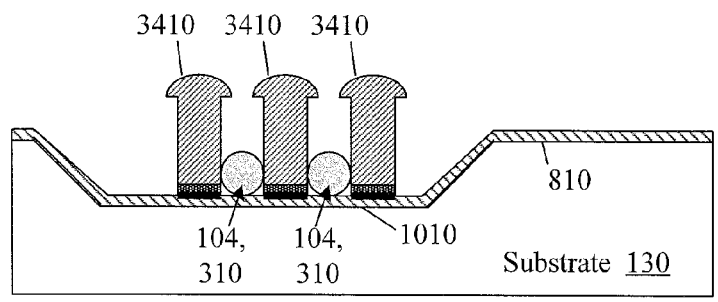

Another fabrication process is illustrated in FIGS. 34D-34E. Spacers 3410 are formed by electroplating as in FIGS. 33A-33C. More particularly, the wafer is processed as in FIG. 33A. Layer 520 will serve as an electroplating mask, and in the embodiment of FIG. 34D layer 520 covers the entire wafer except for the locations of channels 310. Then layer 3410 is electroplated onto seed layer 3420 as described above in connection with FIG. 33B, except that the electroplating process continues until the layer 3410 overlaps the mask 520. In FIG. 34D, the adjacent features (spacers) 3410 do not meet above the mask 520, so the channels 310 are not completely covered on top; FIG. 34E shows the structure after removal of layer 520 and insertion of fibers 104 into channels 310; the spacers 3410 partially overlie the channels and the fibers. In other embodiments, layer 3410 is electroplated until the adjacent features 3410 meet over mask 520, so the channels 310 and the fibers are covered on top as in FIG. 34A.

After the electroplating the layer 520 is removed (by a wet etch for example). Before or after the removal of layer 520, spacer layer 3410 can be patterned to provide discontinuous spacers as in FIG. 34B for example. Also, layer 520 can be formed to extend into selected areas between the channels 310 to prevent formation of spacers 3410 in such areas. Then mirrors 144 can be formed as described above.

If the channels 310 are completely or partially covered as in FIGS. 34A-34E, then the fiber position is more secure.

Figure 2:
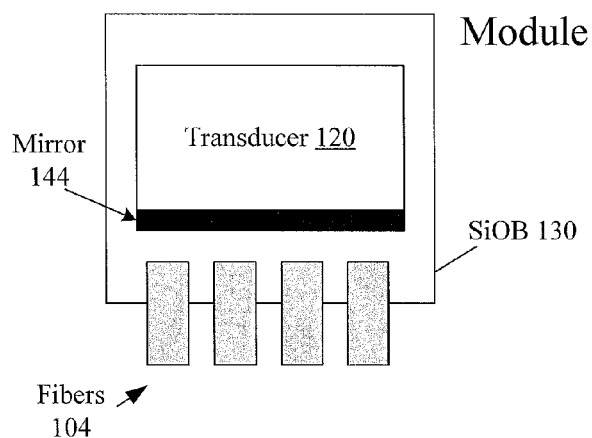
FIG. 2 is a top view of a part of the system of FIG. 1.

In some embodiments, grooves with optical fibers are provided both at the top and bottom surfaces of the interposer. The grooves at each surface can be formed using any techniques described above, including the prior art techniques described in connection with FIGS. 1-3. One exemplary process is as follows. Substrate 130 is thinned to its final thickness. Then V-grooves or other grooves are etched in substrate 130 on both sides, possibly simultaneously, possibly with a wet etch. Then each side is processed, possibly as the top side in FIG. 1-3, to finish the interposer fabrication.

Figure 35A:
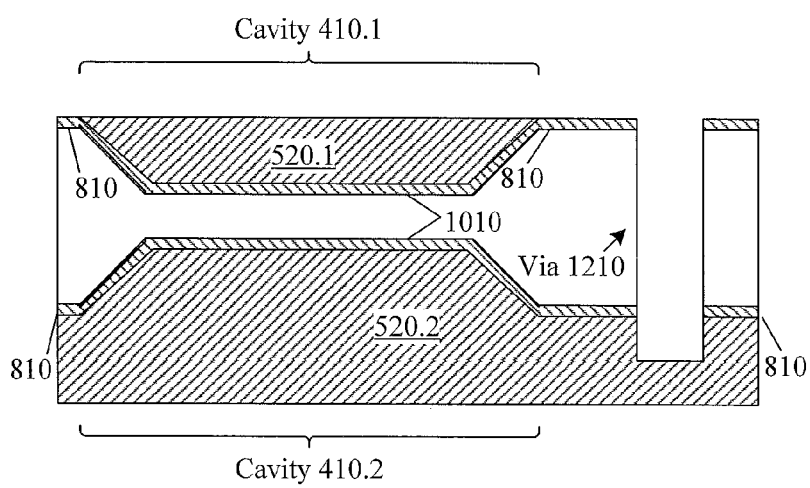

In some embodiments, the interposer is formed as follows. Substrate 130 is thinned to its final thickness. Then cavities 410.1, 410.2 (FIG. 35A) are etched respectively in the top and bottom surfaces of the substrate, possibly simultaneously, using the processes described above or any other suitable processes. In FIG. 35A, a mask 810 is used on the top and bottom to define the two cavities. (There can be any number of cavities on the top and bottom, possibly a different number of cavities on the top than on the bottom, and the cavities on the top do not have to overlie the bottom cavities and do not have to be aligned in any way.) Etch stop layer 1010 is formed on the top and bottom surfaces, possibly simultaneously (e.g. by thermal oxidation of silicon or by CVD), as described above. Then layer 520 is formed on the top and bottom surfaces of the wafer using the techniques described above or other techniques. This layer is shown as 520.1 on the top surface, and as 520.2 on the bottom surface. The top layer 520.1 is planarized as in FIG. 11, to be removed outside of cavity 410.1. The bottom layer may also be planarized, but it covers the whole bottom surface of the wafer. The thickness is chosen to accommodate the through-substrate-via process described below, and can be any suitable value.

Then a blind via 1210 is formed in the top surface of the wafer by a masked etch of layer 810 and substrate 130 at each location of a desired through-substrate via as described above in connection with FIG. 12. Via 1210 passes through substrate 130 and through layer 810 above and below the substrate and partially, but not completely, passes through layer 520.2.

Figure 35B:
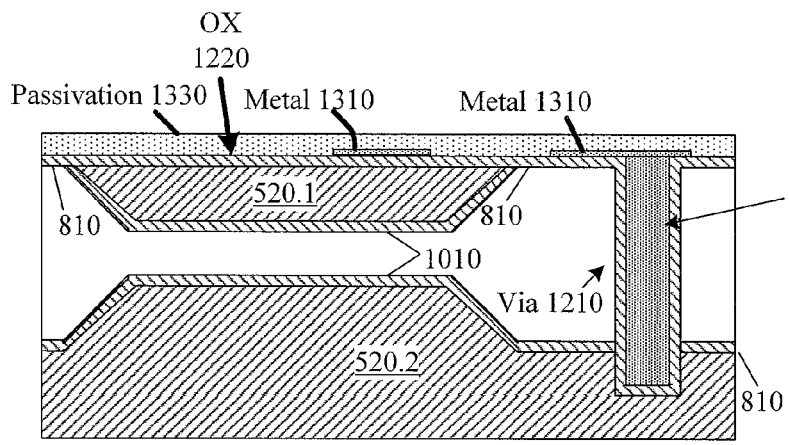

As shown in FIG. 35B, vias 1210 are then oxidized and metalized, and conductive lines 1310 and possibly other circuit elements and passivation 1330 are formed on top of the interposer, using processes described above in connection with FIGS. 12-13.

Figure 35C:
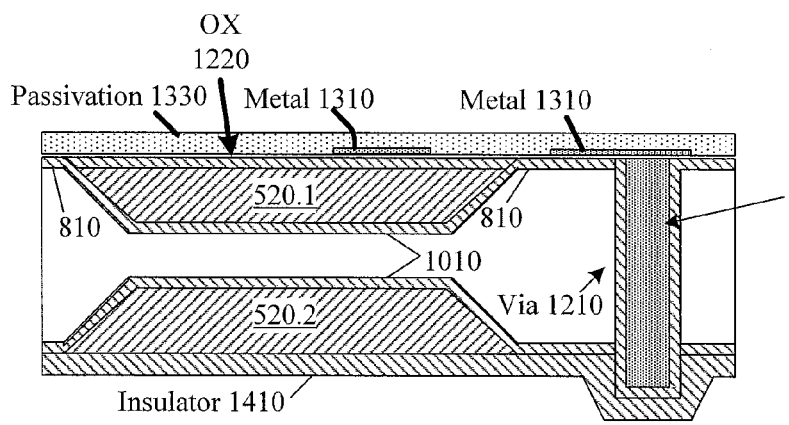

Then (FIG. 35C) the interposer is thinned, by CMP or other processes, to remove the layer 520.2 down to the level of oxide 1010 at the interposer bottom. Vias 1220 become through holes. Copper 1250 (and seed 1230) and insulator 1220 protrude down from substrate 130. Then insulator 1410 (e.g. polyimide) is deposited on the bottom surface, and the bottom surface is planarized by CMP which does not remove all of insulator 1410 but exposes the copper. Suitable processes are described above in connection FIGS. 14-15.

Figure 35D:
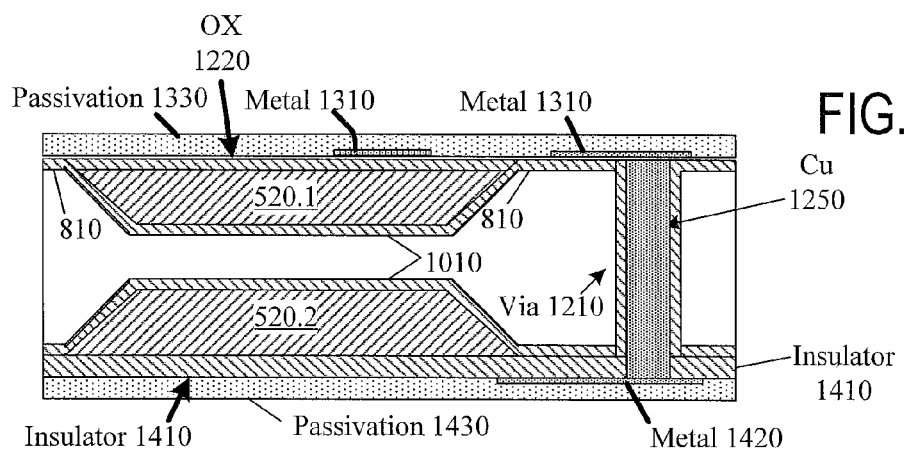

Conductive lines 1420 and other circuit elements and passivation 1430 are formed on the interposer bottom as described above in connection with FIGS. 15-16 and illustrated in FIG. 35D.

Layers 520.1, 520.2 are etched to form grooves 310 and the interposer top and bottom, and mirrors 410 are formed at the top and bottom, as described above in connection with FIGS. 17A, 17B, 18. FIG. 35E shows an exemplary vertical cross section perpendicular to grooves 310. The cavities 410.1, 410.2 do not have to be aligned, i.e. cavity 410.1 can be laterally shifted relative to cavity 410.2. The grooves 310 also may have different shapes and dimensions. More than one cavity can be provided on top and/or bottom, and the top grooves 310 do not have to be parallel to the bottom grooves.

The structure is further processed as described above in connection with any of FIGS. 19-26, and any variations in the top or bottom processing can be used as described above in connection with FIGS. 1-34E. (In particular, prior art techniques for groove and mirror formation can be used on one or both interposer sides.) FIG. 35F shows an exemplary structure at a stage similar to FIG. 22B, with transducers 120.1, 120.2 on top and bottom respectively. In this embodiment, the two transducers are connected to each other through a metalized via 1210, but this is not necessary. Different transducers can be connected to different vias, or not connected to any vias, and controllers 1610 (FIG. 22A) and other circuits can be mounted on the interposer as needed.

In some embodiments, the through vias 1210 are created without first forming blind vias, i.e. the vias 1210 are etched through the interposer wafer right away. Also, the invention is not limited to through vias.

Figure 36:
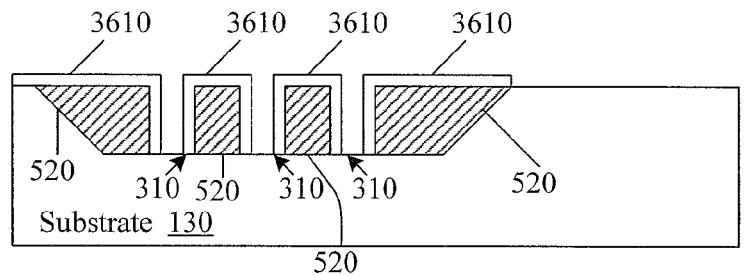
FIGS. 36, 37 show vertical cross sections of optical interposers during fabrication according to some embodiments of the present invention.

A wide variety of cavity shapes are possible to meet the requirements of a particular application. For example, FIG. 36 shows a variation of the method of FIGS. 6A-6C. In this variation, layer 520 is covered by a layer 3610 made of a different material than 520, possibly of the same material as the cavity surface. Layer 3610 can be formed on layer 520 by selective deposition, or can be deposited to a greater thickness on top of layer 520 than on the cavity bottom and can be anisotropically etched until it is removed from the cavity bottom, or layer 3610 can be left on the cavity bottom (this is not shown in FIG. 36).

Figure 37:
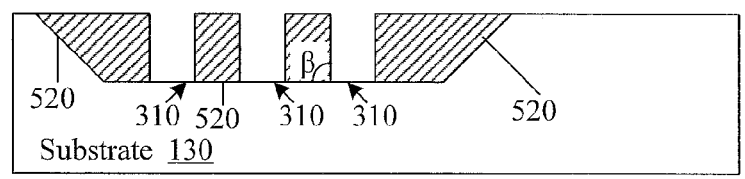

The sidewalls of spacers 520 or 3410 can be at any angle 13 (FIG. 37) to the cavity's bottom surface. In some embodiments, this angle is 90° or some other angle of at least 85°.

Figure 38:
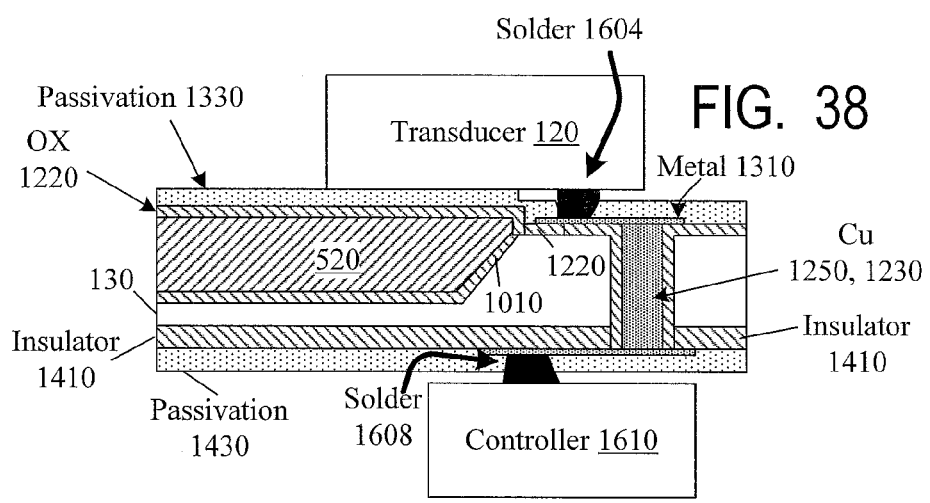
FIG. 38 shows a vertical cross section of a module with an optical interposer according to some embodiments of the present invention.

In some embodiments, at least one spacer protrudes upward to provide mechanical support for at least one of the transducers. One example illustrated in FIG. 38, showing a structure similar to FIG. 22A but without the metal 1310 and solder 1604 over the cavity. Transducer 120 rests on passivation 1330 above spacer 520. For example, at the stage of FIG.

11, layer 520 can be left to protrude upward above substrate 130. Layer 520 can then be etched off outside the cavity as needed to form the electrical circuitry. The upward protrusion of layer 520 at the cavity will result in the upward protrusion of passivation 1330 over the cavity.

Figure 39A:
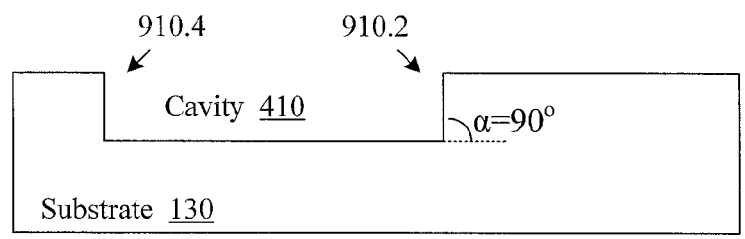
FIGS. 39A, 39B, 39C show vertical cross sections of optical interposers during fabrication according to some embodiments of the present invention.
Figure 39B:
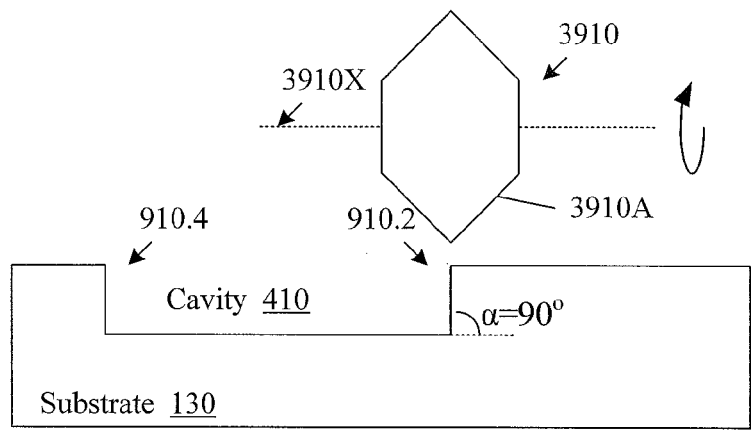
Figure 39C:
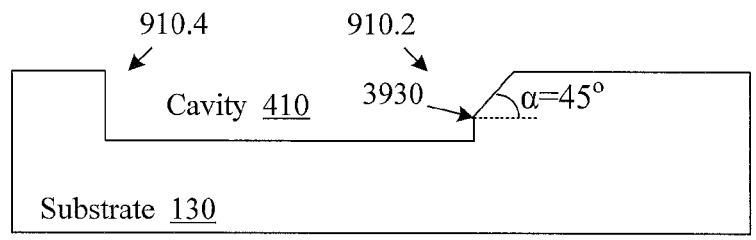
Figure 40:
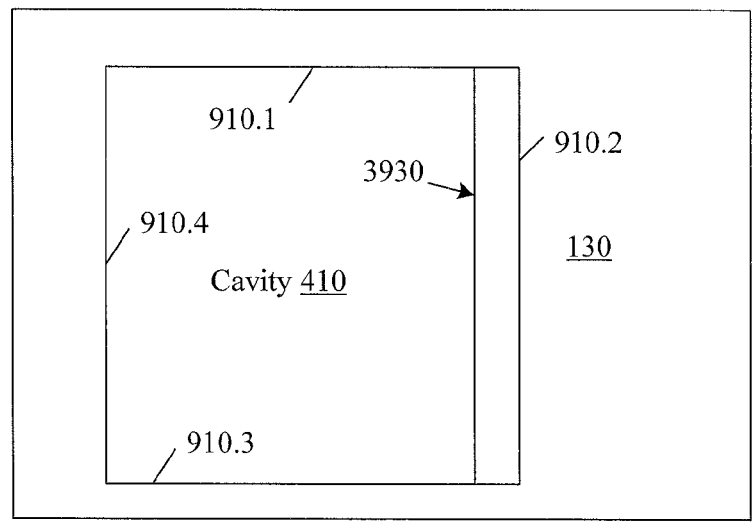
FIG. 40 is a top view of an optical interposer during fabrication according to some embodiments of the present invention.

In some embodiments, the "mirror" sidewalls, such as sidewall 910.2 of FIG. 9A, can be formed by a separate etch or other process. For example, mirror sidewall 910.2 can be at a different angle and/or depth than sidewalls 910.1, 910.3, 910.4. One possible process is illustrated in FIGS. 39A-39C. This process is suitable for a wide variety of substrate materials including monocrystalline silicon and other materials described above. Initially (FIG. 39A), cavity 410 is formed with all the sidewalls being vertical or at some other angle. In some embodiments, the cavity is formed by a masked dry etch with a photoresist mask (not shown, similar to mask 810 in FIG. 8). Then (FIG. 39B) the photoresist is removed, and sidewall 910.2 is etched to change its geometry. Other sidewalls of the cavity may or may not be similarly processed, and either an entire sidewall or only part of a sidewall may be so processed. In the embodiment shown, the geometry of sidewall 910.2 is defined by mechanical machining, and more particularly using a dicing saw 3910 having a 45° sidewall 3910A facing the sidewall 910.2. Saw 3910 rotates around a horizontal axis 3910X perpendicular to sidewall 910.2 to change the sidewall geometry. Sidewall 910.2 acquires a 45° profile matching the saw sidewall 3910A. See FIG. 39C (vertical cross section) and FIG. 40 (top view).

Subsequent steps can be as described above and below in connection with FIGS. 1-38. In particular, the cavity can be filled with layer 520, possibly after deposition of layer 1010, and such cavities can be formed both at the top and the bottom of substrate 130 by the process of FIGS. 39A-39C or other processes.

Figure 41:
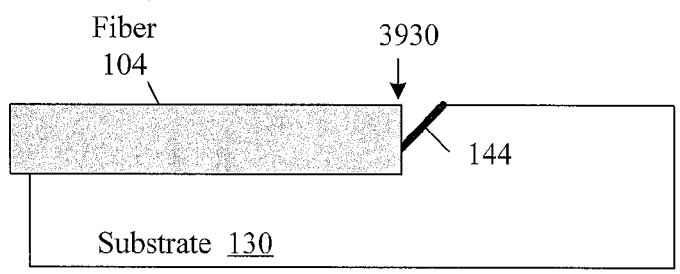
FIGS. 41, 42 show vertical cross sections of optical interposers with fibers according to some embodiments of the present invention.

In some embodiments, the sawing or other processing of sidewall 910.2 (FIG. 39B) is performed to a controlled depth, and in the embodiment of FIG. 39C the depth is less than the depth of cavity 410. This results in a step 3930 along the cavity sidewall 910.2. This step can be used as a hard stop for fibers 104 to facilitate the fiber alignment as shown in FIG. 41—the fibers are inserted in grooves 310 so that they abut the step 3930. (For simplicity, FIG. 41 does not show oxide 1010 and other features that may or may not be present as in FIGS. 6A-38.) If desired, the mirror sidewall 910.2 can be deeper than the rest of the cavity, or can be of the same depth.

Figure 42:
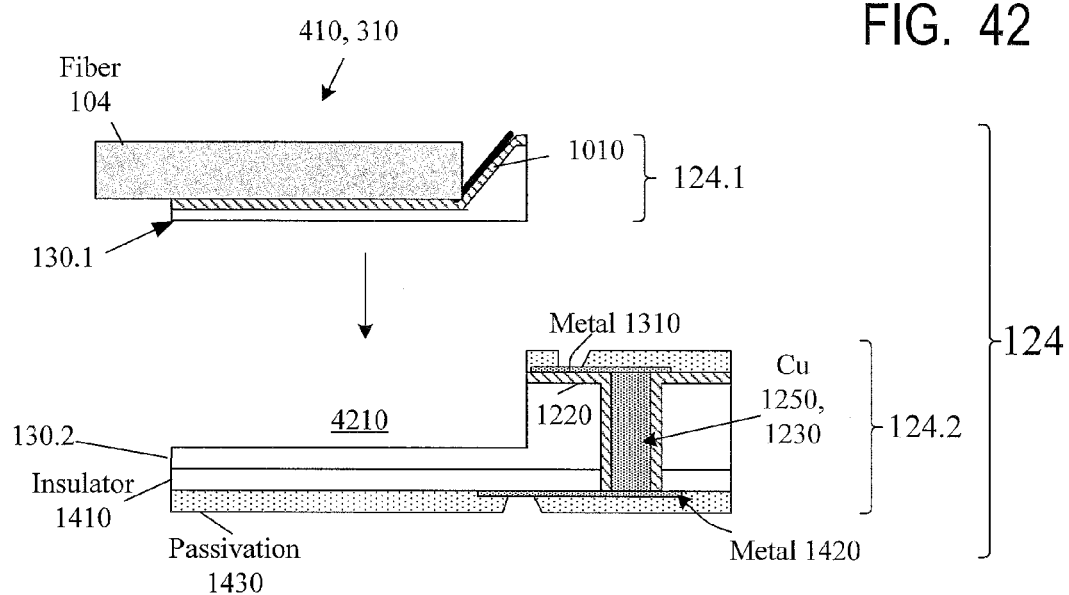
Figure 43:
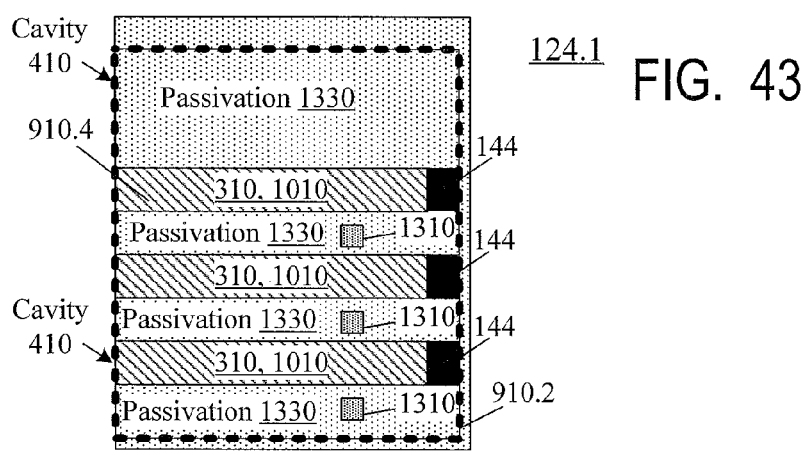

As illustrated in FIG. 42, the cavity with grooves 310 and the electrical circuitry can initially be formed in separate wafers, shown as interposers 124.1 and 124.2, which are then assembled into a single optical interposer 124. An exemplary fabrication process is as follows. Optical interposer 124.1 is fabricated by processing a substrate 130.1 (monocrystalline silicon or other suitable material) as in FIGS. 8-19 to form cavity 410 and grooves 310 and mirrors 144, but without electrical circuitry outside the cavity 410. Oxide 1220, metal 1310, and passivation 1330 may be present in interposer 124.1 in the cavity area as in FIGS. 17A-19. Circuit elements and pads of metal 1310 can thus be formed in the cavity area. Then the wafer is thinned and diced to obtain a structure containing the cavity as shown in top view in FIG. 43. One or more sidewalls may (but does not have to) be removed in the dicing process as described above in connection with FIG. 19. Process variations can be used as described above, including the variation of FIGS. 39A-39C.

In a separate process, interposer 124.2 is fabricated by processing a substrate 130.2 (monocrystalline silicon or other suitable material) to form electrical circuitry for connection to transducers and other circuits. The wafer processing can be as described above in connection with FIGS. 12-16. A cavity 4210 is formed in substrate 130.2. Optical interposer 124.1 is inserted into this cavity and affixed to the cavity, e.g. by adhesive or otherwise. Fibers 104 can be inserted in grooves 310 and suitably affixed (e.g. with adhesive) before or after the attachment of interposer 124.1 to interposer 124.2. Transducers and other circuits can be attached to combined interposer 124 as described above.

Interposer 124.1 may have discontinuous spacers and/or mirrors 144 on different sidewalls as FIGS. 24-26, and interposer 124.1 or 124 may have other features described above in connection with FIGS. 6A-41. In particular, in some embodiments, interposer 124.2 has cavities 4210 on top and bottom, and a separate interposer or interposers 124.1 are inserted into each cavity.

FIGS. 44A-46 illustrate another embodiment, in which the interposer 124.1 is a just a substrate supporting the spacers. The substrate is shown at 4410 and the spacers at 4420. FIG. 44A is a top view of interposer 124.1, and FIG. 44B is a side view. The spacers define channels 310. In some embodiments, the substrate and spacers are an integral structure formed by a masked etch of the substrate. The substrate can be silicon, polysilicon, or any other suitable material. In some embodiments, the entire interposer 124.1 is made of a photosensitive material, e.g. photoresist or photosensitive polymer. In some embodiments, the entire interposer 124.1 is stamped from photoresist, epoxy, or another material, or is made by molding or extrusion. In other embodiments, spacers 4420 can be made of a thin film deposited on substrate 4410 and patterned. Other processes can also be used. Also, the spacers may have any shape discussed above, including discontinuous shapes as in FIGS. 27A-28, or the shapes overlying the channels 310 as in FIGS. 34A-34E.

Interposer 124.2 (FIG. 45) can be manufactured using any techniques discussed above for interposers 124 except that the interposer 124.2 does not need spacers. FIG. 45 shows a vertical cross section of an exemplary interposer 124.2 like one described above in connection with FIG. 22B but without the spacers. For example, the interposer 124.2 can be manufactured as described above but with the spacer etch of FIG. 17A being replaced by complete removal of layer 520. As shown in FIG. 46 (same vertical cross section as in FIG. 45), interpose 124.1 is then affixed within cavity 410 of interposer 124.2, e.g. with adhesive 4430, or solder, or other suitable techniques depending on the materials in layer 1010 and interposer 124.1 and possibly on other factors. Interposer 124.1 can be larger or smaller than cavity 410. For example, interposer 124.1 can protrude on the left out of cavity 410.

Fibers 104 can be mounted in channels 310 at any desired stage, before or after attaching the interposer 124.1 to interposer 124.2. Transducer 120 can be mounted on interposer 124.1 as described above in connection with FIG. 22A for example.

The invention is not limited to a particular structure of interposers 124.1, 124.2. For example, in some embodiments, the interposer 124.2 has a retrograde sidewall as in FIG. 4.

Figure 47:
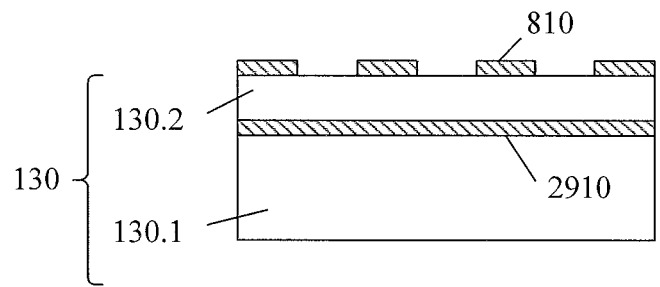
FIGS. 47, 48A, 48B, 48C, 48D, show vertical cross sections of optical interposers during fabrication according to some embodiments of the present invention.
Figure 48A:
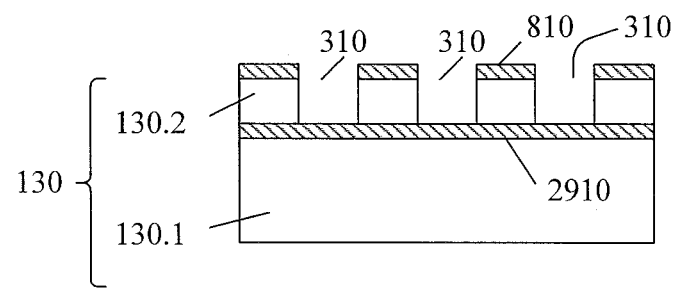
Figure 48B:
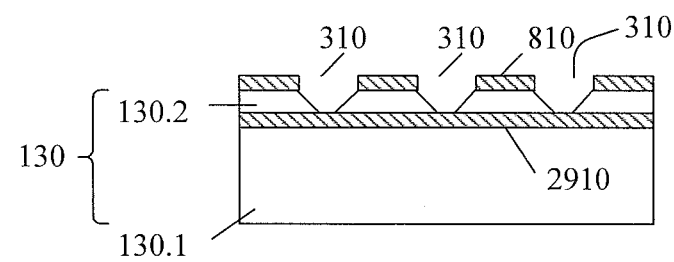
Figure 48C:
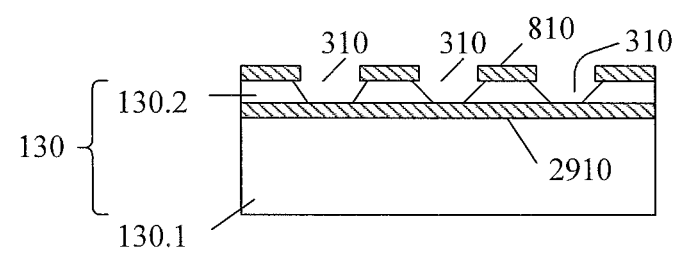
Figure 48D:
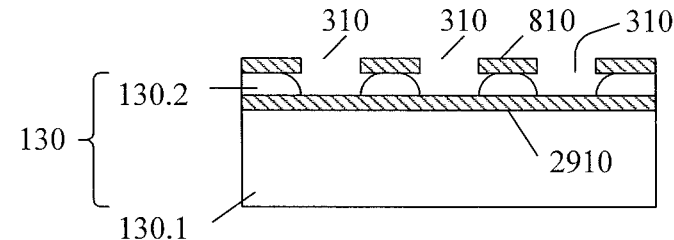

FIGS. 47-48D illustrate another type of embodiments, in which the grooves 310 are made by etching an SOI substrate 130 such as described above in connection with FIGS. 29-30. Substrate 130 has monocrystalline silicon layers 130.1, 130.2 separated by a planar insulating layer 2910. A masking layer 810 (photoresist or a hard mask such as described above) is formed on layer 130.2 as shown in FIG. 47, Then an etch is performed to form the grooves, with different groove geometries shown in FIGS. 48A-48D. FIGS. 47-48D show a vertical cross section perpendicular to grooves 310. In each case, the etch stops on insulating layer 2910. The mirror sidewalls supporting the mirrors 144 (not shown in FIGS. 47-48D) are formed by the same etch or a separate etch.

In FIG. 48A, the etch forming the grooves 310 and the spacers is an anisotropic vertical etch, e.g. a dry etch, possibly RIE (reactive ion etching). In FIG. 48B, the etch is a wet etch selective to certain crystal planes. For example, in some embodiments, the layer 130.2 has a (100) orientation, and the grooves are parallel to a <100> direction, and the etch is selective to {110} planes, as described above in connection with FIGS. 29-30. The groove sidewalls are therefore inclined at a 45° angle to the horizontal. The mirror sidewalls supporting the mirrors 144 (not shown in FIGS. 47-48D) are formed by the same etch or a separate etch. Other orientations and etching techniques can also be used, e.g. a dry etch.

In FIG. 48C, the etch is dry and partially but not fully anisotropic (preferentially vertical), allowing for some lateral etching. The mask 810 is undercut, and the sidewalls of grooves 310 are sloped. An exemplary etch is reactive ion etching (RIE) or deep reactive ion etching (DRIE) in which the gas flow rates and pressure are controlled using well known techniques to provide sidewalls inclined at 45° to 54°.

In FIG. 48D, the etch is also dry and partially but not fully anisotropic (preferentially vertical), allowing for some lateral etching. The mask 810 is undercut, and the spacers have rounded convex sidewalls. An exemplary etch is RIE or DRIE in which the gas flow rates and pressure are controlled in well known manner so that the etch is initially more isotropic but progressively becomes more and more preferentially vertical due to pressure reduction and suitable gas flow control.

Figure 48E:
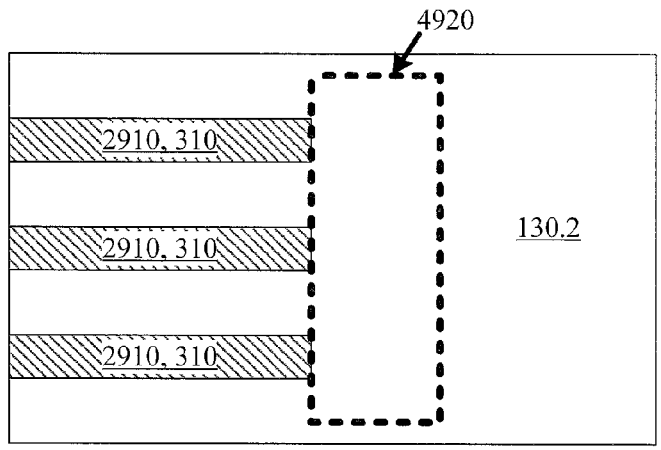
FIG. 48E is a top view of an optical interposer during fabrication according to some embodiments of the present invention.
Figure 49:
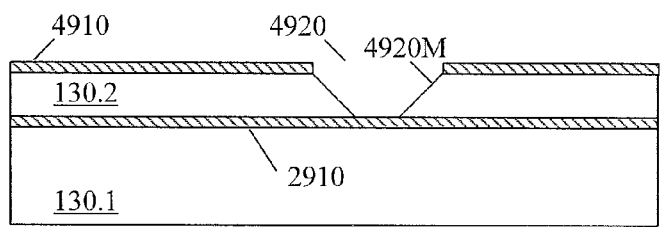
FIG. 49 shows a vertical cross section of an optical interposer during fabrication according to some embodiments of the present invention.
Figure 50:
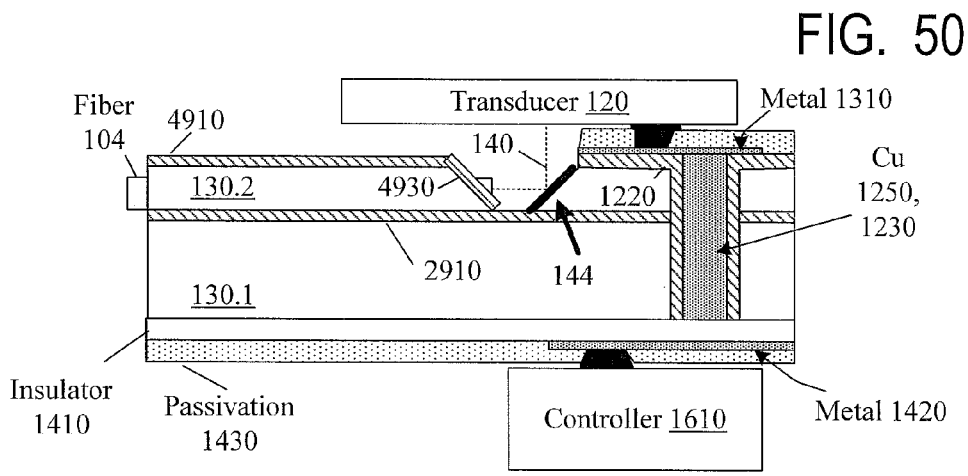
FIGS. 50, 51 show vertical cross sections of modules with optical interposers and fibers according to some embodiments of the present invention.
Figure 51:
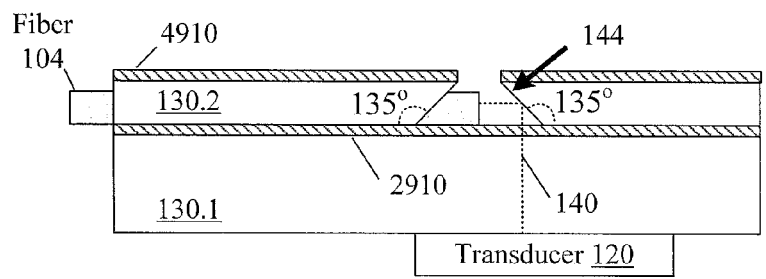

The remaining processing can be any suitable kind, and FIGS. 48E-51 illustrate some options. FIG. 48E shows the top view at of the structure after removal of mask 810 (the mask removal is optional). FIGS. 49-51 show vertical cross sections along a spacer 130.2. As shown in FIG. 49, a mask 4910 (e.g. hard mask or photoresist) is formed to define a transversal groove 4920 whose position is shown in dotted lines in FIG. 48E. Groove 4920 is formed by suitable processing to define a 45° sidewall 4920M for a mirror 144 (provided by the sidewall or by a separate layer, not shown). For example, in some embodiments, the layer 130.2 is oriented (100), the sides of groove 4920 in the view of FIG. 48E have <100> directions, and the groove 4920 is formed by a wet KOH etch selective to (110) planes as described above to form 45° sidewalls for the groove. The etch stops on insulating layer 2910. In other embodiments, the layer 130.2 and the groove 4920 may have any orientation, the groove is formed by a perfectly vertical etch, and the 45° sidewall 4920M is formed using a dicing saw as described above in connection with FIGS. 39A-41. Further, continuous groove 4920 can be replaced by separate grooves for the respective separate channels 310. Other embodiments are also possible.

Subsequent processing can be as in many examples provided above, and FIGS. 50 and 51 illustrate some options. FIG. 50 shows an example of a structure similar to that of FIG. 22A. FIG. 50 also shows a protective layer 4930 formed on the sidewalls of groove 4920. The protective layer is removed from the mirror sidewall 4920M. The remaining processing steps can be essentially as described above for the structure of FIG. 22A, or 26, or other interposer structures. The metalized vias can be formed at any suitable stage. An alternative structure is shown in FIG. 51. Here the groove 4920 has retrograde sidewalls (e.g. 135° sidewalls) as in FIG. 4. Such sidewalls can be formed as described below in connection with FIGS. 52A-59 for example. The invention is not limited to particular structures or processing steps except as defined by the claims.

Figure 4:
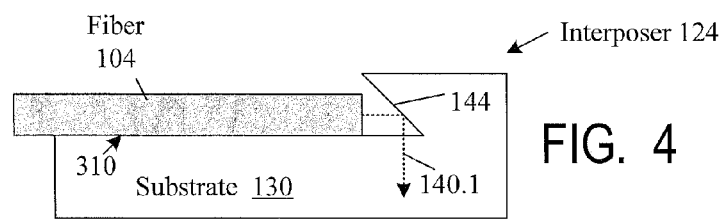
FIG. 4 shows a vertical cross section of an optical interposer with fibers according to some embodiments of the present invention.
Figure 52A:
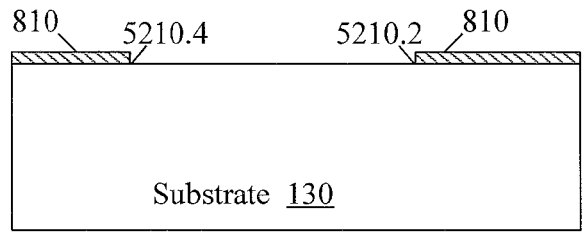
FIG. 52A shows a vertical cross section of an optical interposer during fabrication according to some embodiments of the present invention.
Figure 52B:
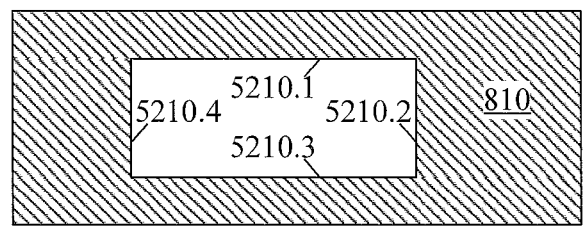
FIG. 52B is a top view of an optical interposer during fabrication according to some embodiments of the present invention.

We will now describe retrograde structure formation used in some embodiments of FIG. 4 or 51. The silicon interposer of FIG. 4 or 51 can be manufactured using a monocrystalline silicon substrate 130 (or layer 130.2 in FIG. 51) having (100) orientation. As shown in FIGS. 52A (vertical cross section) and 52B (top view), a suitable mask 810 (e.g. thermal or CVD silicon dioxide) is formed to define a cavity 410. In this embodiment, the mask opening is rectangular, with sides 5210.1-5210.4 extending along <100> directions. A retrograde angle of 135° will be formed at one or more of these sides as described below. In some embodiments, each side at which the retrograde angle is desired extends along a <100> direction, but the other sides may extend along different directions. The invention is not limited to rectangular mask openings.

An anisotropic, perfectly vertical etch selective to mask 810 forms a cavity 410 (FIG. 53, vertical cross section) with vertical sidewalls. This can be a dry etch for example. Then (FIG. 54, vertical cross section) a wet etch is conducted selective to the {110} silicon planes to deepen the cavity and undercut the cavity edges to form retrograde, 135° sidewalls. The same wet etch can be used as any of the etches forming 45° sidewalls for FIG. 9A. In some embodiments, the cavity depth is doubled or more than doubled by the wet etch.

Figure 55A:
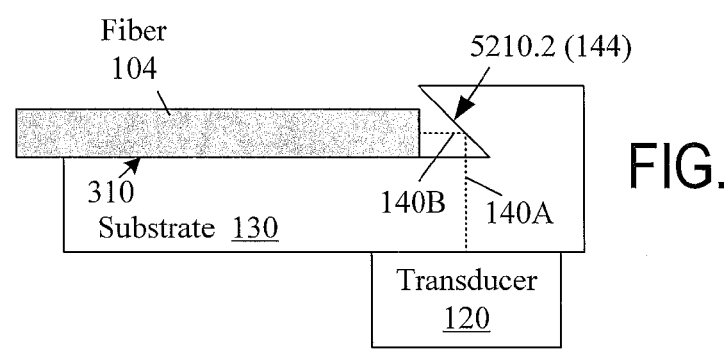
FIGS. 55A, 55B show vertical cross sections of modules with optical interposers and fibers according to some embodiments of the present invention.
Figure 55B:
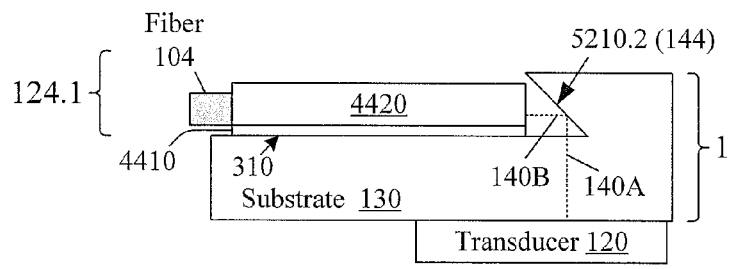
Figure 56:
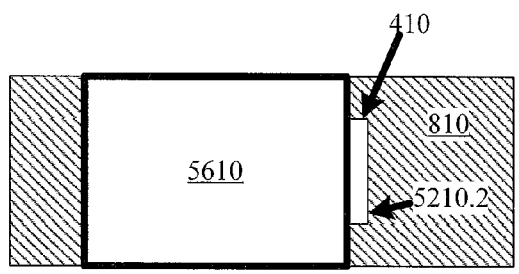
FIG. 56 is a top view of an optical interposer during fabrication according to some embodiments of the present invention.
Figure 57:
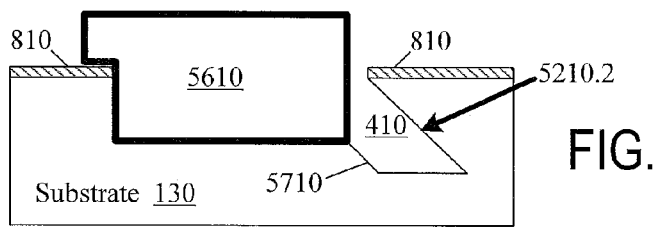
FIGS. 57, 58 show vertical cross sections of optical interposers during fabrication according to some embodiments of the present invention.

Further processing is conducted as needed. For example, to form the structure of FIG. 4, mask 810 is removed (FIG. 55A), and the wafer is diced to remove the side 5210.4. A transducer 120 is attached to the bottom of substrate 130 by any suitable means (e.g. adhesive). A fiber or fibers 104 are affixed in the cavity. The mirrors 144 are provided by the silicon sidewall surface 5210.2. FIG. 55A shows an exemplary light beam between the fiber and the transducer; the light beam has a leg 140B parallel to the cavity's bottom surface, and a leg 140A perpendicular to the cavity's bottom surface. The light beam can travel in either one or both of the two directions—from the fiber to the transducer and/or from the transducer to the fiber.

In some embodiments, before the wafer is diced, a suitable material (e.g. polymer, not shown) is deposited and patterned to define spacers, similar to spacers 520 in FIG. 17B, with grooves 310 for fibers 104. The spacers can also be formed subtractively as in FIGS. 32A-32C. The spacer material is etched out from under the retrograde sidewalls by a suitable process, e.g. a wet etch.

Alternatively, the spacers and the grooves can be defined by mask 810 (FIGS. 52A-52B), i.e. the mask 810 can cover the spacer areas between the grooves. The spacers and the grooves will then be formed by the etches of FIGS. 53, 54. In this case, the grooves may have retrograde sidewalls—a groove's transversal cross section can be as in FIG. 5.

The spacers and the grooves can be provided by a separate interposer 124.1 (FIG. 55B) which can be identical to the interposer 124.1 of FIG. 44B.

FIGS. 56-59 illustrate an embodiment in which only the side 5210.2 is retrograde, the remaining sides are vertical except for the portions adjacent to side 5210.2. Fabrication proceeds as in FIGS. 52A, 52B, 53 to form the cavity 410 with vertical sidewalls 5210.1-5210.4. Then a mask 5610 (FIG. 56, top view) is formed which covers the cavity 410 except for a region adjacent to sidewall 5210.2. Then the wet etch is performed as described above with respect to FIG. 54. The wet etch is selective to mask 5610. The wet etch deepens the cavity portion exposed by mask 5610 and forms a 135° retrograde profile at side 5210.2 and at the portions of sides 5210.1, 5210.3 (not shown) adjacent to side 5210.2. A 45° slope 5710 is formed at the deepened cavity portion across from the side 5210.2.

Figure 58:
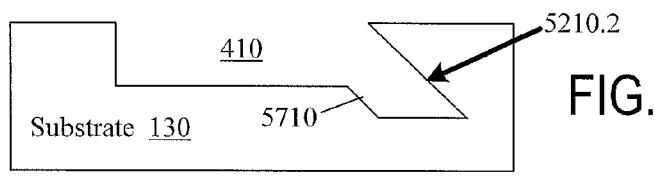
Figure 59:
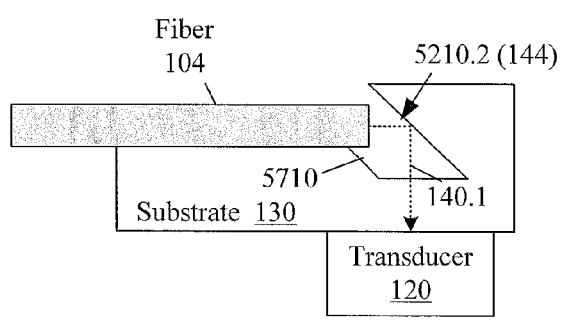
FIG. 59 shows a vertical cross section of a module with an optical interposer and fibers according to some embodiments of the present invention.

Mask layers 810 and 5610 are then removed (see FIG. 58, vertical cross section). The structure is diced, then transducer 120 and fibers 104 are attached (FIG. 59, vertical cross section) as described above in connection with FIG. 55A. Spacers can be formed as described above in connection with FIG. 55A or 55B.

The retrograde sidewalls can be at an angle other than 135°. For example, a 125.3° angle is possible if the sidewalls are {111} planes in a (100) or (110) wafer. To get such angle, side 5210.2 should be oriented [111] in a (100) wafer, and should be oriented in a (110) wafer.

In some optical embodiments described above, fibers 104 are optional; the light beams are transmitted through space without fibers. For example, in some embodiments, the light beams are laser beams.

Figure 5:
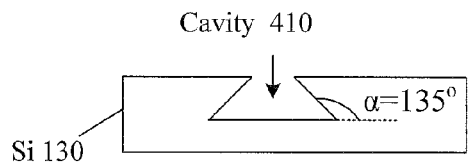
FIG. 5 shows a vertical cross section of a structure formed from a monocrystalline silicon substrate according to some embodiments of the present invention.

In some embodiments, the retrograde sidewalls are used for MEMS applications as mentioned above in connection with FIG. 5. For example, FIG. 60 (vertical cross section as in FIG. 54) shows a sensor based on a silicon structure such as shown in FIG. 5 or 54. The sensor is made of a monocrystalline silicon wafer 130 having a (100) orientation and having a cavity 410 with at least two retrograde sidewalls at 135° or 125.3° angles formed by silicon crystal planes. The cavity can be formed as described above in connection with FIGS. 52A-54. Thin substrate portion 6010 at the cavity bottom provides a membrane whose deformations are detected by circuitry 6020 shown as a number of blocks formed at the top and/or bottom surfaces of substrate 130. Circuit blocks 6020 may include elements integrated with the substrate 130 and/or external elements connected to the substrate. In some embodiments, membrane 6010 is doped to provide one or more resistors connected to circuit 6020. If the membrane is deformed, one or more of the resistors may become stretched, and hence more resistive, or may become compressed and thus less resistive. The current or voltage through the resistor or resistors is detected by circuit 6020 using known techniques. See e.g. U.S. Pat. No. 4,905,523 issued Mar. 6, 1990 to Okada; U.S. Pat. No. 5,998,234 issued Dec. 7, 1999 to Murata et al.; and U.S. patent application Ser. No. 12/951,738 filed Nov. 22, 2010 by Wu et al., published as US 2012/0060605 A1 on Mar. 15, 2012, all of which are incorporated herein by reference.

In other MEMS embodiments, circuit blocks 6020 include a transducer that causes membrane 6010 to heat or deform to affect liquid or gas (not shown) in cavity 410. Such functionality may be provided in addition to sensor functionality or may be provided in MEMS structures without sensor functionality.

Figure 61:
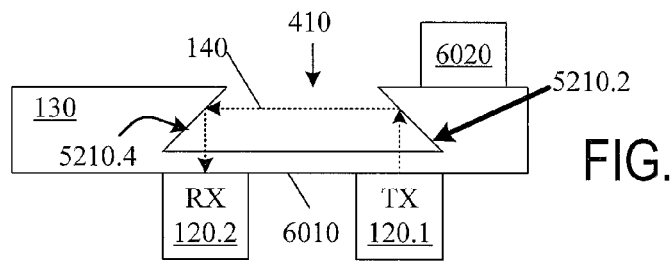

In the sensor embodiments, the membrane motion can also be optically detected as illustrated in FIG. 61. In this embodiment, the cavity sidewalls 5210.2, 5210.4 are at 135° as in FIG. 54. Transmitter 120.1 and receiver 120.2 (which may be transducers formed in separate semiconductor chips or in the same chip) can be rigidly attached to the bottom of membrane 6010 so that they move with the membrane when the membrane deforms, or they can be mounted on a separate mount (not shown) so as not to change their position when the membrane deforms. Transmitter 120.1 transmits a light beam 140 (e.g. laser beam) through the membrane. If membrane 6010 is horizontal, then the beam is reflected by cavity sidewall 5210.2 to travel horizontally to sidewall 5210.4. Sidewall 5210.4 reflects the beam to travel vertically downward through membrane 6010 to receiver 120.2. If the membrane is deformed, then the path of beam 140 will change, and the beam will not hit the receiver 120.2 or will hit the receiver in a different manner, with different measurable parameters, e.g. at a different portion of receiver 120.2 and/or at a different angle and/or with a different spacial distribution of the intensity and/or with a different phase and/or polarization. These differences are detected by receiver 120.2 to provide sensing signals (e.g. electrical signals indicative of the differences).

Figure 60:
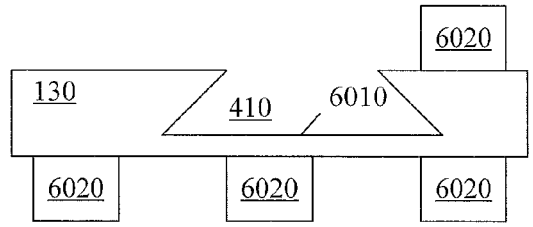
FIGS. 60, 61 show vertical cross sections of sensors with vertical interposers according to some embodiments of the present invention.

The sensors of FIGS. 60, 61 can be used to detect and measure the membrane displacement and/or vibration and/or strain (i.e. pressure on the membrane). Other parameters can also be measured if they are affected by the membrane's displacement or deformation or vibration. Such parameters include temperature, electrical conductivity, electrical resistance, strain, pressure, reflectivity, refractive index, and possibly other parameters.

Figure 62:
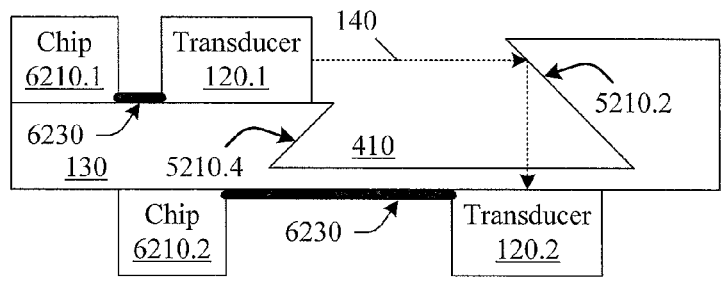
FIG. 62 shows a vertical cross section of a multi-chip module with an interposer used for optical interchip communications according to some embodiments of the present invention.

In some embodiments, sidewalls 5210 of structures of FIG. 54 are used as reflective surfaces for interchip communications. FIG. 62 (vertical cross section) shows substrate 130 used as an optical interposer for communication between chips 6210.1, 6210.2. Chip 6210.1 is connected to transducer 120.1, possibly by conductive lines 6230. Chip 6210.2 is connected to transducer 120.2 by other conductive lines 6230. Chip 6210.1 and transducer 120.1 are attached to the top surface of substrate 130. Chip 6210.2 and transducer 120.2 are attached to the bottom surface of substrate 130. Transducer 120.1 is adjacent to sidewall 5210.4 of cavity 140. Transducer 120.2 is mounted below the cavity. Lines 6230 can be formed in and/or on substrate 130 and/or by discrete lines (not shown). Many variations are possible, e.g. chip 6210.1 and transducer 120.1 can be integrated into a single chip; chip 6210.2 and transducer 120.2 can also be integrated into a single chip; alternatively, one or more of chips 6210.1, 6210.2 can be mounted separately from the interposer; these are non-limiting examples.

Cavity sidewalls 5210.2, 5210.4 are at 135°. Sidewall 5210.2 is taller than sidewall 5210.4. Transducer 120.1 is mounted on the substrate's horizontal surface extending from the cavity edge at the top of sidewall 5210.4. A horizontal beam 140 emitted by transducer 120.1 is reflected by sidewall 5210.2 to travel vertically downward to transducer 120.2. In other embodiments, beam 140 travels in the reverse direction (i.e. from transducer 120.2 to transducer 120.1), or multiple beams in opposite directions can be provided.

Figure 63A:
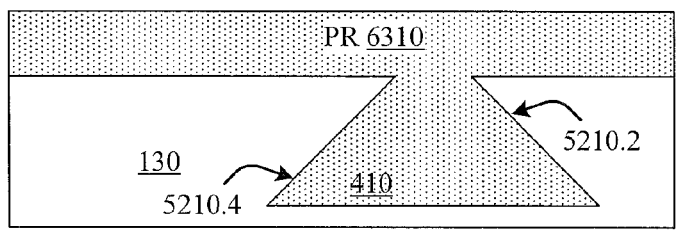
FIGS. 63A, 63B, 63C, 63D, 63E show vertical cross sections of optical interposers during fabrication according to some embodiments of the present invention.
Figure 63B:
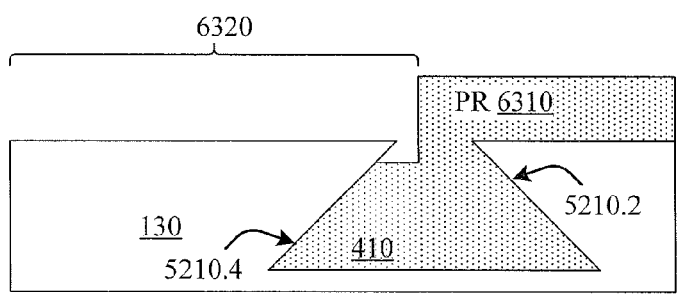
Figure 63C:
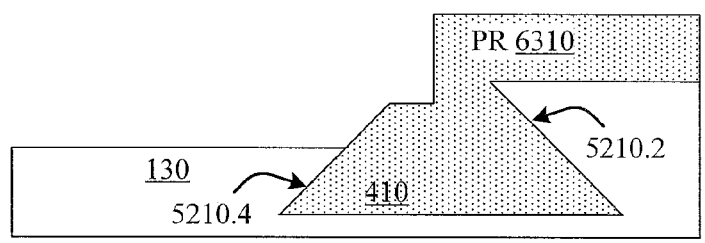

The interposer can be manufactured as illustrated in FIGS. 63A, 63B, 63C (vertical cross sections). First, substrate 130 is processed as in FIGS. 52A-54. Then a layer 6310 of positive photoresist is deposited to fill the cavity 410 and cover the substrate 130. The resist layer has a planar top surface. An opening 6320 (FIG. 63B) is formed in the resist using known techniques so as to expose the substrate 130 over the cavity sidewall 5210.4. The opening may extend into the cavity 410 but the resist is not removed off the cavity bottom so that the cavity bottom is not exposed. The resist patterning can be achieved by exposing the photoresist to a limited depth less than the entire depth over the cavity bottom, as known in the art.

Substrate 130 is etched selectively to resist 6310, i.e. adjacent to sidewall 5210.4. See FIG. 63C. The sidewall 5210.4 becomes shorter. The resist is then stripped to obtain the interposer shown in FIG. 62.

Conductive lines 6230 and other conductive lines can be formed at any suitable stage, and the transducers and chips can be mounted as appropriate.

Since sidewall 5210.4 is not used as a reflector in FIG. 62, sidewall 5210.4 can be vertical or at some other angle. Also, interposer 130 can be as in FIG. 55A or 59, with the transducer 120.1 replacing the fiber 104.

Figure 63D:
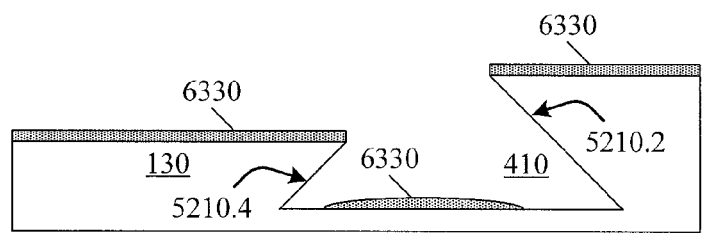
Figure 63E:
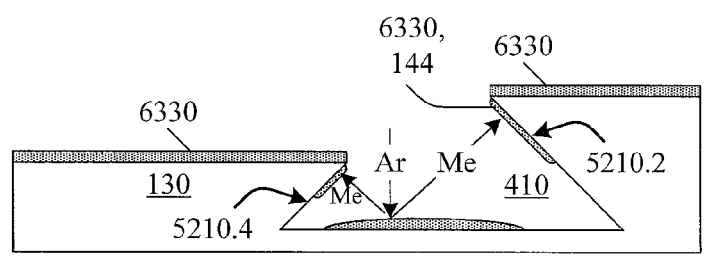

In the embodiment of FIG. 62 and some other optical embodiments with retrograde surfaces (e.g. as in FIGS. 51, 55A, 55B, 59, 61), the reflective properties of a retrograde sidewall (such as sidewall 5210.4) can be improved by forming a smooth reflective layer (similar to layer 144 in FIG. 18)

which provides desired reflection properties, e.g. desired smoothness and desired reflectivity in a desired wavelength range. For example, aluminum or copper can be deposited by chemical vapor deposition (CVD). Sputtering can also be used, followed by re-sputtering, as illustrated in FIGS. 63D and 63E. More particularly, a layer 6330 of a suitable reflective material, e.g. metal (possibly aluminum, copper, gold, silver, or other suitable materials or their combinations) can be sputter-deposited on the top surface of substrate 130. Layer 6330 is non-conformal, covering the surfaces in the line of sight of the sputtering target (not shown) but not covering the retrograde sidewalls 5210.2, 5210.4. See FIG. 63D. Then re-sputtering is performed. In this process, the layer 6330 is bombarded by ions or atoms (e.g. argon) which dislodge the atoms of layer 6330. Some of the atoms dislodged from the bottom of cavity 410 deposit on mirror sidewall 5210.2 and possibly other retrograde sidewalls to provide the reflective mirror 144.

Alternatively, mirrors 144 can be formed on a separate substrate (not shown), then released from the separate substrate and glued to the mirror sidewall or sidewalls (e.g. 5210.2) with an adhesive as described above in connection with FIG. 18.

The invention is not limited to the features described above. For example, different channels 310 may have different lengths in the same structure. Waveguides other than optical fibers can be provided, for any suitable wavelengths including, but not limited to, visible light (from about 380 nm to about 740 nm), or infrared radiation (from about 10 nm and up to the visible light), or ultraviolet radiation (from about the visible light and up to about 300 μm). Other variations are also possible. Some embodiments provide a substrate comprising a region of monocrystalline silicon (e.g. region 130 in FIG. 54), the region comprising:

a first surface which is a crystal plane (e.g. {100} plane) of the monocrystalline silicon (this could, for example, be the bottom surface of cavity 410); and a second surface which is a crystal plane (e.g. {110} plane) of the monocrystalline silicon (this could be a sidewall surface 5210.2 of cavity 410);

wherein the first and second surfaces meet at an angle of 135° or 125.3° to each other, the angle being measured through a space occupied by the monocrystalline silicon (e.g. angle α in FIG. 5).

In some embodiments, the substrate is used for a structure (e.g. as in FIG. 55A or 55B or 59) in which the second surface is a reflector for providing a path of electromagnetic waves, the path having a first segment (e.g. 140B in FIG. 55A or 55B) parallel to the first surface and a second segment (e.g. 140A) passing through the first surface, the first and second segments meeting at the reflector.

Some embodiments comprise a transducer (e.g. 120 in FIG. 55A) meeting the second segment of the path, for receiving the electromagnetic waves from the path or for transmitting the electromagnetic waves into the path. In some embodiments, the transducer is attached to the substrate.

In some embodiments, the electromagnetic waves are in the wavelength range of 10 nm to 300 micrometers.

Figure 53:
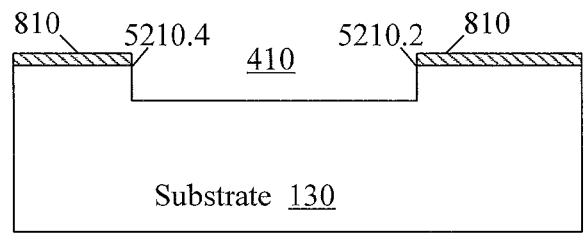
FIGS. 53, 54 show vertical cross sections of optical interposers during fabrication according to some embodiments of the present invention.
Figure 54:
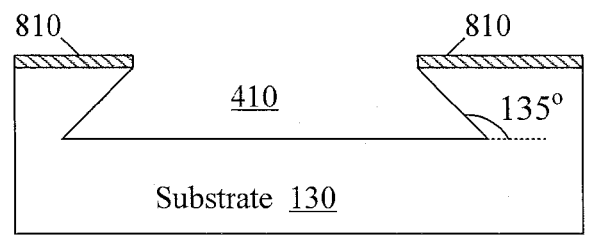

Some embodiments provide a method for manufacturing a substrate, the method comprising:

obtaining a region of monocrystalline silicon, the region having a first surface (e.g. top surface of substrate 130 in FIG. 52A) which is a crystal plane (e.g. (100) plane) of the monocrystalline silicon;

forming a via in the first surface (e.g. the via can be cavity 410 in FIG. 53, or can be a through hole), the via having a sidewall which forms an angle or angles less than a predefined angle α of 135° or 125.3°, the angle α being the angle between the sidewall and a first plane passing through the via's bottom and parallel to the first surface (e.g. the first plane can be the bottom surface of cavity 410 in FIG. 53; if the via is a through hole, the first plane can be a horizontal plane passing through the via bottom), the angle α being measured through the monocrystalline silicon region; and wet-etching the sidewall selectively to predefined crystal planes of the monocrystalline silicon region (e.g. selectively to the {110} planes), to form a second surface (e.g. sidewall surface 5210.4 in FIG. 54) at the angle α to the first plane.

Some embodiments provide an interposer (e.g. 124 in FIG. 46) for interfacing a plurality of waveguides (e.g. optical fiber cables 104) to one or more transducers which are for being coupled to the one or more waveguides, each waveguide being for transmitting electromagnetic waves to and/or from one or more of the transducers, the interposer comprising:

(a) a first interposer structure (e.g. 124.1) comprising one or more first spacers (e.g. 4420) which define a plurality of first channels (e.g. 310) for supporting the waveguides; and (b) a second interposer structure (e.g. 124.2) comprising a first cavity (e.g. 410), the first interposer structure being attached to the first interposer structure and being at least partially located in the first cavity;

wherein the first cavity comprises a sidewall surface (e.g. right sidewall of cavity 410 in FIG. 45) comprising one or more sidewall portions (e.g. a sidewall portion could be a portion in a single groove 310);

wherein each first channel has a first end (e.g. the right end, adjacent to mirror 144) which is adjacent to an associated one of the one or more sidewall portions, each sidewall portion being for providing and/or supporting a redirecting element (e g mirror 144 portion for a single groove 310) for directing an electromagnetic wave coming into and/or out of the first channel's respective waveguide.

Some embodiments provide a method for fabricating an interposer for interfacing a plurality of waveguides to one or more transducers, the method comprising:

forming a first cavity in a substrate (e.g. 410 in FIG. 32A);

forming a first layer (e.g. 520) over the first cavity's bottom surface, with one or more gaps in the first layer's top surface (e.g. gaps between features 520 in FIG. 32A);

forming a second layer (e.g. 3410) in the one or more gaps; and removing at least part of the first layer to form a plurality of channels separated from each other by portions of the second layer that are located in the one or more gaps, the second layer portions in the one or more gaps providing one or more spacers in the first cavity, wherein the plurality of channels are for supporting waveguides for transmitting electromagnetic waves, wherein the waveguides are to be coupled to one or more transducers.

In some embodiments, forming the second layer comprises forming the second layer to overlap the first layer (as in FIG. 34C or 34D for example); and wherein removing at least part of the first layer comprises removing at least part of the first layer from under the second layer.

In some embodiments, forming the second layer comprises electroplating the second layer in the one or more gaps. Note FIG. 34D for example.

Some embodiments further comprise forming a seed layer (e.g. 3420) for the electroplating of the second layer, the seed layer being formed before the first layer;

wherein forming the first layer with the one or more gaps comprises:
forming the first layer without the one or more gaps; and
removing the first layer at a location of the one or more gaps to form the one or more gaps and expose the seed layer in the one or more gaps.

Some embodiments provide an interposer for interfacing a plurality of waveguides to one or more transducers which are for being coupled to the waveguides, the interposer comprising a top surface having a first cavity therein;
wherein the interposer also comprises one or more first spacers on the first cavity's surface, wherein the one or more first spacers define a plurality of first channels for supporting the waveguides (for example, the spacers can include layer 3410 between channels 310 in FIG. 34A of 34E);
wherein at least one first spacer overlaps at least one first channel (e.g. as in FIG. 34A or 34E).

In some embodiments, at least two adjacent first spacers meet over a first channel (e.g. as in FIG. 34A for example).

Some embodiments further comprise electrical circuitry for connection to the one or more transducers. See e.g. FIG. 22A-26, 31, 35F, 38, 59.

Some embodiments provide a method for fabricating an interposer, the method comprising:
obtaining a substrate comprising a first layer of semiconductor material (e.g. 130.1 in FIGS. 47-48D) and an insulating layer underlying the first layer of semiconductor material (e.g. layer 2910);
forming a mask (e.g. 810) over the first layer of semiconductor material to define a plurality of channels in the second layer, the channels being for supporting waveguides which are to be coupled to one or more transducers;
etching the first layer selectively to the mask and to the insulating layer to form the channels.

Some embodiments further comprise forming one or more grooves in the first layer (e.g. groove 4920 in FIG. 49, or multiple grooves (not shown)—a separate groove can be formed at the end of each channel 310 for example; different channels 310 may have different lengths if desired), wherein each groove has one or more sidewall portions (e.g. 4920M), wherein each channel has a first end which is adjacent to an associated one of the sidewall portions, each sidewall portion being for providing and/or supporting an optical element for directing light coming into and/or out of the first channel's respective optical fiber cable (the optical element can be a portion of minor 144 across from the respective channel 310; the mirror can be metal, or the surface of silicon 130.2 as in FIG. 51).

Other embodiments and variations may be within the scope of the invention, as defined by the appended claims.

The invention claimed is:
1. A method for fabricating an interposer for interfacing a plurality of waveguides to one or more transducers, the method comprising:
forming a first cavity in a top surface of a substrate;
forming a first layer over the first cavity's bottom surface, with one or more gaps in the first layer's top surface;
forming a second layer in the one or more gaps, the second layer overlapping the first layer; and
removing at least part of the first layer to form a plurality of channels separated from each other by portions of the second layer that are located in the one or more gaps, the second layer portions in the one or more gaps providing one or more spacers in the first cavity, the one or more spacers at least partially covering the channels, wherein the plurality of channels are for supporting the waveguides for transmitting electromagnetic waves, wherein the waveguides are to be coupled to the one or more transducers;
wherein removing at least part of the first layer comprises removing at least part of the first layer from under the second layer;
wherein the method further comprises:
forming one or more conductive paths passing through the substrate outside the cavity, each conductive path passing between the top surface of the substrate and a bottom surface of the substrate;
attaching the one or more transducers above the substrate, each transducer extending over at least one said channel for being optically coupled to at least one waveguide in the channel, each transducer being electrically coupled to at least one said conductive path;
attaching a controller below the substrate, the controller being electrically coupled to each transducer by electrical circuitry comprising at least one said conductive path.

2. The method of claim 1 wherein the electromagnetic waves are in the wavelength range of 10 nm to 300 micrometers.

3. The method of claim 2 further comprising placing optical fiber cables into said channels to serve as the waveguides.

4. The method of claim 1 wherein forming the second layer comprises electroplating the second layer in the one or more gaps.

5. The method of claim 4 further comprising forming a seed layer for the electroplating of the second layer, the seed layer being formed before the first layer;
wherein forming the first layer with the one or more gaps comprises:
forming the first layer without the one or more gaps; and
removing the first layer at a location of the one or more gaps to form the one or more gaps and expose the seed layer in the one or more gaps.

6. The method of claim 1 wherein at least two adjacent first spacers meet over one of said channels.

7. The method of claim 1 wherein forming the first layer to have one or more gaps comprises:
before forming the one or more conductive paths, forming the first layer to have no gaps and to provide a planar top surface over the first cavity;
forming the one or more gaps in the first layer after forming at least parts of the one or more conductive paths.

8. A method for fabricating an interposer for interfacing a plurality of waveguides to one or more transducers, the method comprising:
forming a first cavity in a top surface of a substrate;
forming a first layer over the first cavity's bottom surface, with one or more gaps in the first layer's top surface;
forming a second layer in the one or more gaps, the second layer overlapping the first layer; and
removing at least part of the first layer to form a plurality of channels separated from each other by portions of the second layer that are located in the one or more gaps, the second layer portions in the one or more gaps providing one or more spacers in the first cavity, the one or more spacers at least partially covering the channels, wherein the plurality of channels are for supporting the waveguides for transmitting electromagnetic waves, wherein the waveguides are to be coupled to the one or more transducers;
wherein removing at least part of the first layer comprises removing at least part of the first layer from under the second layer.

9. The method of claim 8 wherein the electromagnetic waves are in the wavelength range of 10 nm to 300 micrometers.

10. The method of claim 8 further comprising placing optical fiber cables into said channels to serve as the waveguides.

11. The method of claim 8 wherein forming the second layer comprises electroplating the second layer in the one or more gaps.

12. The method of claim 11 further comprising forming a seed layer for the electroplating of the second layer, the seed layer being formed before the first layer;
   wherein forming the first layer with the one or more gaps comprises:
   forming the first layer without the one or more gaps; and
   removing the first layer at a location of the one or more gaps to form the one or more gaps and expose the seed layer in the one or more gaps.

13. The method of claim 9 wherein at least two adjacent first spacers meet over one of said channels.

\* \* \* \* \*